US011994502B2

(12) United States Patent
Amador et al.

(10) Patent No.: US 11,994,502 B2
(45) Date of Patent: May 28, 2024

(54) AUTOMATED ONLINE CHROMATOGRAPHIC SAMPLE DILUTION AND PREPARATION SYSTEM

(71) Applicant: Snapdragon Chemistry, Inc., Waltham, MA (US)

(72) Inventors: Adrian G. Amador, Framingham, MA (US); Yuanqing Fang, Belmont, MA (US); David D. Ford, Cambridge, MA (US); Mikhail V. Goncharuk, West Roxbury, MA (US); Grace Russell, Waltham, MA (US)

(73) Assignee: Snapdragon Chemistry, Inc., Waltham, MA (US)

( * ) Notice: Subject to any disclaimer, the term of this patent is extended or adjusted under 35 U.S.C. 154(b) by 239 days.

(21) Appl. No.: 17/340,264

(22) Filed: Jun. 7, 2021

(65) Prior Publication Data

US 2021/0382023 A1 Dec. 9, 2021

Related U.S. Application Data

(60) Provisional application No. 63/035,287, filed on Jun. 5, 2020.

(51) Int. Cl.
*G01N 30/30* (2006.01)
*G01N 30/02* (2006.01)
(Continued)

(52) U.S. Cl.
CPC ............ *G01N 30/88* (2013.01); *G01N 30/30* (2013.01); *G01N 30/32* (2013.01); *G01N 30/84* (2013.01);
(Continued)

(58) Field of Classification Search
CPC ........ G01N 30/88; G01N 30/30; G01N 30/32; G01N 30/84; G01N 2030/027;
(Continued)

(56) References Cited

U.S. PATENT DOCUMENTS 7,669,489 B2 3/2010 Staples et al.
8,574,432 B2 11/2013 Shih et al.
(Continued)

FOREIGN PATENT DOCUMENTS

EP 1 205 756 A2 5/2002
EP 3 391 041 A1 10/2018
(Continued)

OTHER PUBLICATIONS

Chocholous, P., et al, "An overview of sequential injection chromatography", Analytica chimica acta, 600, pp. 129-135. (Year: 2007).*

(Continued)

*Primary Examiner* — Benjamin L Lebron
(74) *Attorney, Agent, or Firm* — COOLEY LLP

(57) ABSTRACT

The present disclosure relates to a computer-implemented method for analyzing a product stream of a chemical reaction. The method includes withdrawing a portion of the product stream of the chemical reaction from a reactor, the portion of the product stream having a volume of less than about 200 μL. The method further includes mixing the portion of the product stream with a diluent to produce a sample and then transferring the sample to a liquid chromatography device. A measured chemical profile is then developed, via the liquid chromatography device, which can be used for process monitoring or real time decision making. In some embodiments, the method can include adjusting a
(Continued)

reaction condition in the reactor based on differences between the measured chemical profile and a desired chemical profile.

28 Claims, 13 Drawing Sheets

(51) Int. Cl.
  *G01N 30/32* (2006.01)
  *G01N 30/84* (2006.01)
  *G01N 30/88* (2006.01)
(52) U.S. Cl.
  CPC . *G01N 2030/027* (2013.01); *G01N 2030/324* (2013.01); *G01N 2030/8435* (2013.01); *G01N 2030/8804* (2013.01); *G01N 2030/8809* (2013.01)
(58) Field of Classification Search
  CPC ..... G01N 2030/324; G01N 2030/8435; G01N 2030/8804; G01N 2030/8809
  See application file for complete search history.

(56) References Cited

U.S. PATENT DOCUMENTS 10,191,018 B2    1/2019    Lee et al.
2019/0308191 A1*   10/2019   Hart ................... B01L 3/50273

FOREIGN PATENT DOCUMENTS

WO    WO 2017/103180 A1    6/2017
WO    WO-2019038924 A1 *   2/2019 .............. G01N 1/00

OTHER PUBLICATIONS

Garn, M., et al, "A flow injection analysis system for fermentation monitoring and control", Biotechnology and Bioengineering, vol. 34, pp. 423-428. (Year: 1989).*
Economou, A, et al., "Enzymatic chemiluminescent assay of glucose by sequential-injection analysis with soluble enzyme and on-line sample dilution", Analytica chimica acta, 572, pp. 140-147. (Year: 2006).*
Seckin, Z., et al, "Flow injection fluorescence determination of dopamine using a photo induced electron transfer (PET) boronic acid derivative", Analytica chimica acta, 547, pp. 104-108. (Year: 2005).*
Steiner, F., et al, "HPLC autosamplers: perspectives, principles, and practices", LCGC North America, vol. 37, Issue 8, pp. 514-529. (Year: 2019).*
Machine translation of WO 2019/038924.*
Barnett et al., "Sequential injection analysis: an alternative approach to process analytical chemistry," Trac Trends in Analytical Chemistry, May 1, 1999, 18(5), 346-353.
International Search Report and Written Opinion issued in PCT/US2021/036194 dated Sep. 27, 2021, 1-15.
Mortensen, et al., "Real-time monitoring and chemical profiling of a cultivation process," Chemometrics and Intelligent Laboratory Systems, Dec. 1, 2006, 84(1-2), 106-113.
Haas, et al., "Automated generation of photochemical reaction data by transient flow experiments coupled with online HPLC analysis," React. Chem. Eng., 2020, 5, 912-920.
Lambertus, et al., "Development of Universal, Automated Sample Acquisition, Preparation, and Delivery Devices and Methods for Pharmaceutical Applications," Org. Process. Res. Dev., 2019, 23, 189-210.

* cited by examiner

AUTOMATED ONLINE CHROMATOGRAPHIC SAMPLE DILUTION AND PREPARATION SYSTEM

CROSS-REFERENCE TO RELATED APPLICATIONS

This application claims priority to and the benefit of U.S. Provisional Patent Application No. 63/035,287 entitled "Automated Online Chromatographic Sample Dilution and Preparation System," filed Jun. 5, 2020, the disclosure of which is hereby incorporated by reference in its entirety.

TECHNICAL FIELD

Embodiments described herein relate to systems and computer-implemented methods for analyzing a product stream of a chemical reaction.

BACKGROUND

Liquid chromatography (LC) is a chemical analysis method that utilizes the partition coefficients of the constituents of a mixture between a mobile phase and a stationary phase. LC has several advantages over other chemical analysis methods. First, LC can aid in determining a chemical makeup of a solution of mixture with high specificity. Additionally, LC has excellent linear quantification properties. In other words, sample concentrations can be calculated from a calibration curve of standard values plotted linearly.

LC and chromatography in general also have several drawbacks. LC typically includes several process steps that are difficult to implement manually. First, samples are withdrawn and then diluted. Dilution of samples aids in making the samples injectable into a chromatography column. The diluted sample is transferred to a liquid chromatography device, where the chemical makeup of the sample can be measured or determined. Each of the steps in the LC process are prone to operator error and imprecisions in execution. Any imprecision that occurs during either step of the LC process can be compounded and propagated throughout the LC process. LC is also difficult to implement for hydrolytically unstable species, and derivatization of hydrolytically unstable species is often practiced to make the species more stable for LC implementation. In addition, data retrieved and analyzed from an LC column can be subject to a time delay. In other words, once proper adjustments have been made to a reactor in response to the data retrieved from the LC column, the data retrieved from the LC column may no longer be accurate. A general automated LC sample dilution and injection system often uses large sample volumes and has a significant carryover from one sample to the next. Some automated LC dilution/injection systems are only applicable to homogeneous reaction samples from flow or batch processes, but not capable of sampling from flow reactor systems (e.g., CSTR, PFR) and batch systems with heterogeneous reaction mixture. An enduring goal is to develop a system and computer-implemented method, in which real-time adjustments can be made to reaction conditions to influence products with minimal sample volume and minimal carryover from one sample the next.

SUMMARY

The present disclosure relates to a computer-implemented method for analyzing a product stream of a chemical reaction. The method includes withdrawing a portion of the product stream of the chemical reaction from a reactor, the portion of the product stream having a volume of less than about 200 µL. The method further includes mixing the portion of the product stream with a diluent to produce a sample and then transferring the sample to a liquid chromatography device. A measured chemical profile is then developed, via the liquid chromatography device, which can be used for process monitoring or real time decision making. In some embodiments, the method can include adjusting a reaction condition in the reactor based on differences between the measured chemical profile and a desired chemical profile. In some embodiments, the reaction condition can include at least one of a pump rate, a flow rate, a temperature, a pressure, and an application of light. In some embodiments, the diluent can be added to the portion of the product stream at a ratio of at least about 50:1. In some embodiments, the product stream can be a first product stream, and the method can include analyzing a second product stream with less than about 1% carryover from the first product stream, and without implementing a priming run. In other words, two product streams can be analyzed in back-to-back orders with less than about 1% carryover.

DETAILED DESCRIPTION

Figure 1:
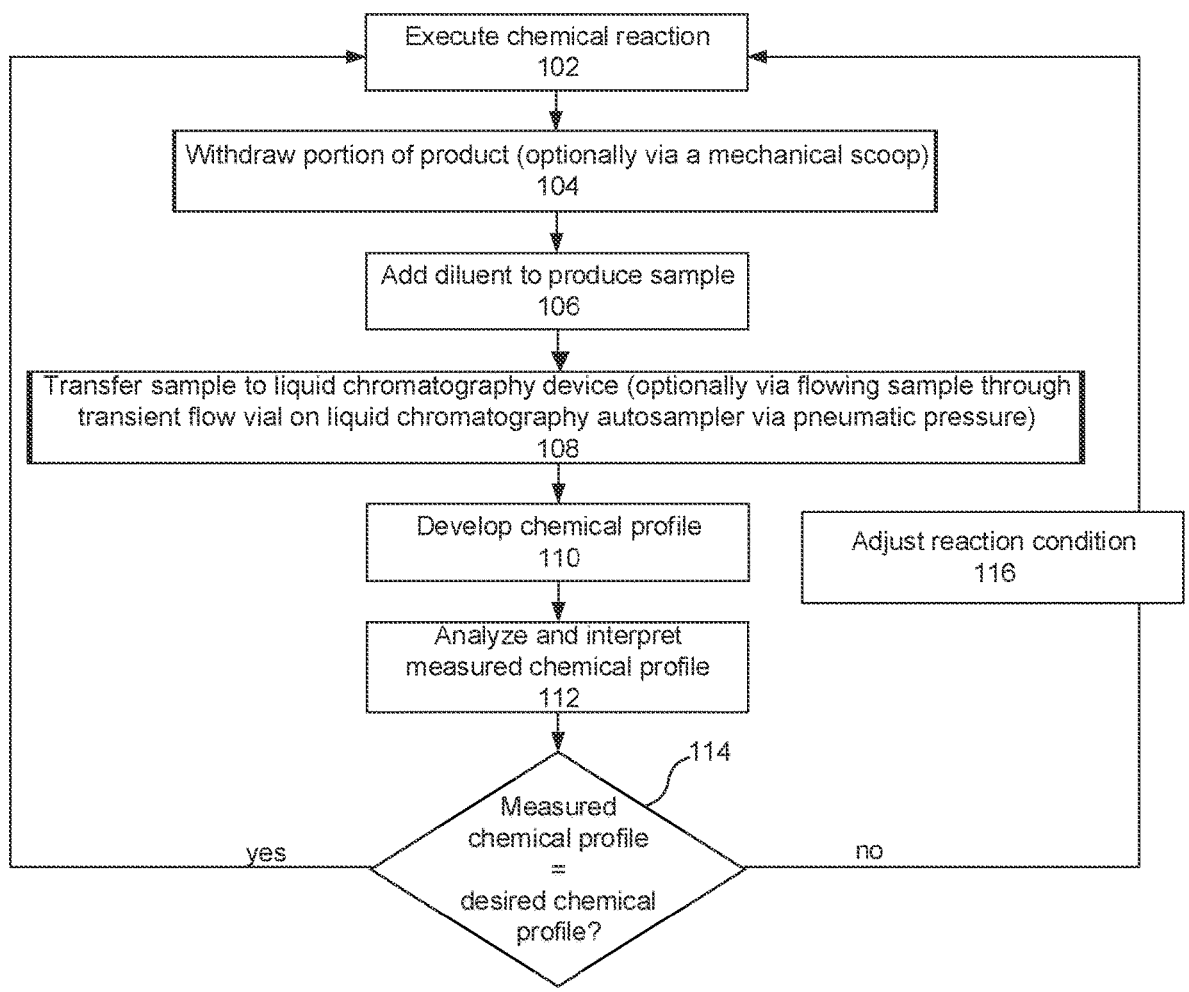
FIG. 1 is a schematic illustration of a method of implementing an online chromatographic sample dilution and preparation, according to an embodiment.

Embodiments described herein relate to systems and computer-implemented methods for analyzing a product stream of a chemical reaction. In some embodiments, the product stream can be analyzed via LC. LC is a separation technique that includes mixing of a reaction product with a liquid. The liquid acts as a mobile phase. The reaction product is dissolved or mixed with the liquid, and the resulting solution or mixture is fed into an LC column or plane. The column or plane includes a stationary phase with very small packing particles and is often maintained at a high pressure. The mobile phase then forces the reaction product through the stationary phase, where the partition coefficients of the different components of the reaction product determine whether each component of the reaction product has more of an affinity for the mobile phase or for the stationary phase. The partition coefficients of the different components of the reaction product are largely determined by the polarities, or the dipole moments of the components of the reaction product. However, van der Waals forces, affinity for hydrogen bonding, and other intermolecular forces can also play a role in determining partition coefficients.

LC (and chromatography in general) has several technical advantages over other chemical identification methods (e.g., vibrational spectroscopy, direct mass spectroscopy, infrared spectroscopy, nuclear magnetic resonance). LC can identify compounds with excellent specificity, including isomers. Linear quantification is also applicable in the use of LC. LC is generally the desired chemical identification method for quality target product protocols in the pharmaceutical industry. LC is however not without its drawbacks. Analysis and reaction adjustment is often a long process, not executable in real time. Sample preparation in LC is also a laborious process with fairly low margin for error. LC is not a suitable direct analysis method for hydrolytically unstable species. Derivatization or quenching is often implemented to convert a hydrolytically unstable species to a hydrolytically stable species.

Automation of LC sample preparation can address several of the aforementioned shortcomings of LC. Firstly, an automated LC sample preparation system can analyze and adjust reaction conditions in real time, rather than being subject to delays or inconsistencies due to analysis time by the operator. Process delays brought on by operator analysis time can be significant enough, such that the information the operator applies when adjusting reaction conditions (e.g., temperature, pressure, flow rates) is no longer current. The faster feedback of an automated system can aid in addressing this issue, as reaction conditions can be adjusted appropriately via instant or substantially instant communications from a computer or central processing unit. LC sample preparation (e.g., via dilution, transport of sample) is also a process that can be automated to remove or substantially reduce measurement error associated with sample preparation. Derivatization or quenching can also be automated such that delay associated with derivatization or quenching are minimized.

Automated LC systems in the current state of the art (e.g., Lambertus, G. R. et al. "Development of Universal, Automated Sample Acquisition, Preparation, and Delivery Devices and Methods for Pharmaceutical Applications." *Organic Process Research and Development.* 2019, 23, pp. 189-210) often require withdrawal of a large amount of product (i.e., 0.3 ml to 6 ml) when preparing a sample. Sample carryover and fouling are also issues in currently implemented systems, unless significant priming runs are executed prior to the withdrawal and analysis of each sample. Samples containing particulates or dissolved solids can potentially leave residue behind in tubes and vessels of currently implemented systems. Additionally, automated LC systems have heretofore not been implementable for monitoring batch reactor systems. Embodiments described herein address each of the issues of product withdrawal minimization, sample carryover, minimization of fouling, and reactor type versatility. Embodiments described herein include methods of implementing automated LC sample preparation apparatuses, as well as systems for implementing automated LC sample preparation apparatuses.

As used in this specification, the singular forms "a," "an," and "the" include plural referents unless the context clearly dictates otherwise. Thus, for example, the term "a member" is intended to mean a single member or a combination of members, "a material" is intended to mean one or more materials, or a combination thereof.

The term "substantially" when used in connection with "cylindrical," "linear," and/or other geometric relationships is intended to convey that the structure so defined is nominally cylindrical, linear or the like. As one example, a portion of a support member that is described as being "substantially linear" is intended to convey that, although linearity of the portion is desirable, some non-linearity can occur in a "substantially linear" portion. Such non-linearity can result from manufacturing tolerances, or other practical considerations (such as, for example, the pressure or force applied to the support member). Thus, a geometric construction modified by the term "substantially" includes such geometric properties within a tolerance of plus or minus 5% of the stated geometric construction. For example, a "substantially linear" portion is a portion that defines an axis or center line that is within plus or minus 5% of being linear.

As used herein, the term "product stream" is not limited to reaction products that flow (e.g., an outlet stream from a CSTR, PFR), but can also refer to a stationary product, such as a product solution or mixture withdrawn from a batch reactor after a chemical reaction has occurred in the batch reactor.

As used herein, the term "set" and "plurality" can refer to multiple features or a singular feature with multiple parts. Thus, a set of portions or a plurality of portions may include multiple portions that are either continuous or discontinuous from each other. A plurality of particles or a plurality of materials can also be fabricated from multiple items that are produced separately and are later joined together (e.g., via mixing, an adhesive, or any suitable method).

As used herein, the term "semi-solid" refers to a material that is a mixture of liquid and solid phases, for example, such as a particle suspension, a slurry, a colloidal suspension, an emulsion, a gel, or a micelle.

FIG. 1 is a schematic illustration of a method 100 of implementing an online chromatographic sample dilution and preparation, according to an embodiment. The method 100 includes executing a chemical reaction at step 102, withdrawing a portion of a product stream at step 104, and adding diluent to the portion of the product stream to produce a sample at step 106. The method 100 further includes transferring the sample to a liquid chromatography device at step 108, developing/measuring a chemical profile for the sample at step 110, and analyzing/interpreting the measured chemical profile at step 112. At this point, the method 100 includes a comparison of the measured chemical profile to a desired chemical profile at step 114. If the measured chemical profile matches the desired chemical profile within a prescribed margin of error, reaction conditions employed at step 102 remain the same and the method 100 resumes from step 102 without any change to the reaction conditions. If the measured chemical profile does not match the desired chemical profile within a prescribed margin of error, a reaction condition is adjusted at step 116, and then the reaction proceeds at step 102 with one or more reaction conditions adjusted.

Executing the chemical reaction at step 102 is done in a reactor. In some embodiments, the reactor can include a continuous stirred tank reactor (CSTR), a plug flow reactor (PFR), a batch reactor, or a semi-batch system. In some embodiments, the reactor can be a photoreactor, a photobioreactor, or a mixer. In some embodiments, step 102 can include a derivatization or quenching step. In some embodiments, the derivatization or quenching step can be implemented via an attachment to the reactor that applies a quenching or derivatizing reagent to a reaction product stream as the reaction product stream exits the reactor. In some embodiments, executing the chemical reaction at step 102 can include the use of pumps, pipes, tubes, and/or valves to deliver one or more chemical reagents to the reactor. In some embodiments, step 102 can include adjusting the pressure and/or temperature of conditions inside the reactor. In some embodiments, step 102 can include adjusting physical forces (e.g., photon flux, electrical power) applied to the reactor.

In some embodiments, withdrawal of the portion of the product stream at step 104 can be executed using a withdrawal apparatus with minimal dead volume, thereby minimizing the volume of the portion of the product stream withdrawn during step 104. Withdrawal of a small portion of the product stream at step 104 can aid in minimizing the amount of fouling that occurs in a system, in which the method 100 is implemented. In other words, if the portion of the product stream withdrawn at step 104 has a small volume, the total amount of solids, either dissolved or suspended in the portion of the product stream is also a small amount. This can help minimize the amount of particulates that flow through the tubes, pipes, and vessels of the system, in which the method 100 is implemented. In some embodiments, the portion of the product stream withdrawn at step 104 can be less than about 300 µL, less than about 290 µL, less than about 280 µL, less than about 270 µL, less than about 260 µL, less than about 250 µL, less than about 240 µL, less than about 230 µL, less than about 220 µL, less than about 210 µL, less than about 200 µL, less than about 190 µL, less than about 180 µL, less than about 170 µL, less than about 160 µL, less than about 150 µL, less than about 140 µL, less than about 130 µL, less than about 120 µL, less than about 110 µL, less than about 100 µL, less than about 90 µL, less than about 80 µL, less than about 70 µL, less than about 60 µL, less than about 50 µL, less than about 40 µL, less than about 30 µL, less than about 20 µL, inclusive of all values and ranges therebetween.

In some embodiments, step 104 can be optimized via computed fluid dynamics for representative sampling and minimal carryover. A computed fluid dynamics implementation at step 104 can aid in assuring that the portion of the product stream withdrawn at step 104 is accurately representative of the product stream. In some embodiments, step 104 can include cleaning and priming of a system and tubes used in the method 100. In some embodiments, a sampling apparatus used for executing step 104 can also clean and prime the system and the tubes used in the method 100. In some embodiments, the method 100 can exclude cleaning and/or priming steps. In some embodiments, withdrawal of the portion of the product stream at step 104 can be done via a mechanical scoop.

In some embodiments, the portion of the product stream can be withdrawn at step 104 at a prescribed pressure. In some embodiments, step 104 can be executed at a reactor pressure of at least about 1 bar, at least about 2 bar, at least about 3 bar, at least about 4 bar, at least about 5 bar, at least about 6 bar, at least about 7 bar, at least about 8 bar, at least about 9 bar, at least about 10 bar, at least about 11 bar, at least about 12 bar, at least about 13 bar, at least about 14 bar, at least about 15 bar, at least about 16 bar, at least about 17 bar, at least about 18 bar, or at least about 19 bar. In some embodiments, step 104 can be executed at a reactor pressure of no more than about 20 bar, no more than about 19 bar, no more than about 18 bar, no more than about 17 bar, no more than about 16 bar, no more than about 15 bar, no more than about 14 bar, no more than about 13 bar, no more than about 12 bar, no more than about 11 bar, no more than about 10 bar, no more than about 9 bar, no more than about 8 bar, no more than about 7 bar, no more than about 6 bar, no more than about 5 bar, no more than about 4 bar, no more than about 3 bar, or no more than about 2 bar. Combinations of the above-referenced values are also possible for the reactor pressure at the execution of step 104 (e.g., at least about 1 bar and no more than about 10 bar or at least about 3 bar and no more than about 6 bar). In some embodiments, step 104 can be executed at a reactor pressure of about 1 bar, about 2 bar, about 3 bar, about 4 bar, about 5 bar, about 6 bar, about 7 bar, about 8 bar, about 9 bar, about 10 bar.

In some embodiments, the portion of the product stream can be withdrawn at step 104 at a prescribed temperature. In some embodiments, step 104 can be implemented at a temperature of at least about −150° C., at least about −140° C., at least about −130° C., at least about −120° C., at least about −110° C., at least about −100° C., at least about −90° C., at least about −80° C., at least about −70° C., at least about −60° C., at least about −50° C., at least about −40° C., at least about −30° C., at least about −20° C., at least about −10° C., at least about 0° C., at least about 10° C., at least about 20° C., at least about 30° C., at least about 40° C., at least about 50° C., at least about 60° C., at least about 70° C., at least about 80° C., at least about 90° C., at least about 100° C., at least about 110° C., at least about 120° C., or at least about 130° C. In some embodiments, step 104 can be implemented at a temperature of no more than about 140° C., no more than about 130° C., no more than about 120° C., no more than about 110° C., no more than about 100° C., no more than about 90° C., no more than about 80° C., no more than about 70° C., no more than about 60° C., no more than about 50° C., no more than about 40° C., no more than about 30° C., no more than about 20° C., no more than about 10° C., no more than about 0° C., no more than about −10° C., no more than about −20° C., no more than about −30° C., no more than about −40° C., no more than about −50° C., no more than about −60° C., no more than about −70° C., no more than about −80° C., no more than about −90° C., no more than about −100° C., no more than about −110° C., no more than about −120° C., no more than about −130° C., or no more than about −140° C. Combinations of the above-referenced values for the temperature of step 104 are also possible (e.g., at least about −20° C. and no more than about 140° C. or at least about 20° C. and no more than about 30° C.), inclusive of all values and ranges therebetween. In some embodiments, step 104 can be executed at a temperature of about −20° C., about −10° C., about 0° C., about 10° C., about 20° C., about 30° C., about 40° C., about 50° C., about 60° C., about 70° C., about 80° C., about 90° C., about 100° C., about 110° C., about 120° C., about 130° C., or about 140° C. In some embodiments, step 104 can be executed via a device with a pressure rating of about 1 bar to about 10 bar. In some embodiments, step 104 can be executed via a device with a temperature rating of about −20° C. to about 140° C.

In some embodiments, the portion of the product stream can be withdrawn at step 104 from a homogeneous or substantially homogeneous system. In other words, the portion of the product stream can be withdrawn from a portion of the reactor with a homogeneous or substantially homogeneous concentration of a reagent. In some embodiments, the portion of the product stream can be withdrawn at step 104 from a heterogeneous system. In other words, the portion of the product stream can be withdrawn from a portion of the reactor with a heterogeneous concentration of a reagent.

In some embodiments, the portion of the product stream withdrawn at step 104 can include particulates, or suspended solids. In some embodiments, the particulates or suspended solids can have a total suspended solids (TSS) content of at least about 0 mg/L, at least about 25 mg/L, at least about 50 mg/L, at least about 75 mg/L, at least about 100 mg/L, at least about 125 mg/L, at least about 150 mg/L, at least about 175 mg/L, at least about 200 mg/L, at least about 225 mg/L, at least about 250 mg/L, or at least about 275 mg/L. In some embodiments, the portion of the product stream withdrawn at step 104 can have a TSS content of no more than about 1,000 mg/L, no more than about 900 mg/L, no more than about 800 mg/L, no more than about 700 mg/L, no more than about 600 mg/L, no more than about 500 mg/L, no more than about 400 mg/L, no more than about 300 mg/L, or no more than about 200 mg/L. Combinations of the above-referenced TSS values in the portion of the product stream withdrawn at step 104 are also possible (e.g., at least about 100 mg/L and no more than about 1,000 mg/L or at least about 200 mg/L and no more than about 300 mg/L), inclusive of all values and ranges therebetween. In some embodiments, the portion of the product stream withdrawn at step 104 can have a TSS content of about 100 mg/L, about 200 mg/L, about 300 mg/L, about 400 mg/L, about 500 mg/L, about 600 mg/L, about 700 mg/L, about 800 mg/L, about 900 mg/L, or about 1,000 mg/L. In some embodiments, the particulates or suspended solids can have a minimal fouling effect in subsequent sample runs. In other words, the portion of the product stream withdrawn at step 104 can have a TSS content of up to about 25 mg/L, up to about 50 mg/L, up to about 75 mg/L, up to about 100 mg/L, up to about 125 mg/L, up to about 150 mg/L, up to about 175 mg/L, up to about 200 mg/L, up to about 225 mg/L, up to about 250 mg/L, up to about 275 mg/L, or up to about 300 mg/L without any significant effect on the quality of subsequent samples.

In some embodiments, the portion of the product stream withdrawn at step 104 can include dissolved solids. In some embodiments, the portion of the product stream withdrawn at step 104 can have a total dissolved solids (TDS) content of at least about 0 mg/L, at least about 25 mg/L, at least about 50 mg/L, at least about 75 mg/L, at least about 100 mg/L, at least about 125 mg/L, at least about 150 mg/L, at least about 175 mg/L, at least about 200 mg/L, at least about 225 mg/L, at least about 250 mg/L, or at least about 275 mg/L. In some embodiments, the portion of the product stream withdrawn at step 104 can have a TDS content of no more than about 1,000 mg/L, no more than about 900 mg/L, no more than about 800 mg/L, no more than about 700 mg/L, no more than about 600 mg/L, no more than about 500 mg/L, no more than about 400 mg/L, no more than about 300 mg/L, or no more than about 200 mg/L. Combinations of the above-referenced TDS values in the portion of the product stream withdrawn at step 104 are also possible (e.g., at least about 100 mg/L and no more than about 1,000 mg/L or at least about 200 mg/L and no more than about 300 mg/L), inclusive of all values and ranges therebetween. In some embodiments, the portion of the product stream withdrawn at step 104 can have a TDS content of about 100 mg/L, about 200 mg/L, about 300 mg/L, about 400 mg/L, about 500 mg/L, about 600 mg/L, about 700 mg/L, about 800 mg/L, about 900 mg/L, or about 1,000 mg/L. In some embodiments, the particulates or suspended solids can have a minimal fouling effect in subsequent sample runs. In other words, the portion of the product stream withdrawn at step 104 can have a TDS content of up to about 25 mg/L, up to about 50 mg/L, up to about 75 mg/L, up to about 100 mg/L, up to about 125 mg/L, up to about 150 mg/L, up to about 175 mg/L, up to about 200 mg/L, up to about 225 mg/L, up to about 250 mg/L, up to about 275 mg/L, or up to about 300 mg/L without any significant effect on the quality of subsequent samples.

In some embodiments, the portion of the product stream withdrawn at step 104 can be transferred to a mixing device. At step 106, a diluent can be added to the portion of the product stream to produce a sample. In some embodiments, step 106 can be performed in a mixing device. In some embodiments, the diluent can be miscible or substantially miscible with the portion of the product stream. In some embodiments, the sample produced at step 106 can be homogenized or substantially homogenized. In some embodiments, the diluent can be added to the portion of the product stream at a v:v ratio (diluent:portion of the product stream) of at least about 50:1, at least about 60:1, at least about 70:1, at least about 80:1, at least about 90:1, at least about 100:1, at least about 150:1, at least about 200:1, at least about 250:1, at least about 300:1, at least about 350:1, at least about 400:1, at least about 450:1, at least about 500:1, at least about 550:1, at least about 600:1, at least about 650:1, at least about 700:1, at least about 750:1, at least about 800:1, at least about 850:1, at least about 900:1, or at least about 950:1. In some embodiments, the diluent can be added to the portion of the product stream at a v:v ratio of no more than about 1,000:1, no more than about 950:1, no more than about 900:1, no more than about 850:1, no more than about 800:1, no more than about 750:1, no more than about 700:1, no more than about 650:1, no more than about 600:1, no more than about 550:1, no more than about 500:1, no more than about 450:1, no more than about 400:1, no more than about 350:1, no more than about 300:1, no more than about 250:1, no more than about 200:1, no more than about 150:1, no more than about 100:1, no more than about 90:1, no more than about 80:1, no more than about 70:1, or no more than about 60:1. Combinations of the above-referenced v:v ratios of diluent to portion of the product stream are also possible (e.g., at least about 50:1 and no more than about 1,000:1 or at least about 100:1 and no more than about 300:1), inclusive of all values and ranges therebetween. In some embodiments, the diluent can be added to the portion of the product stream at a v:v ratio of about 50:1, about 60:1, about 70:1, about 80:1, about 90:1, about 100:1, about 150:1, about 200:1, about 250:1, about 300:1, about 350:1, about 400:1, about 450:1, about 500:1, about 550:1, about 600:1, about 650:1, about 700:1, about 750:1, about 800:1, about 850:1, about 900:1, about 950:1, or about 1,000:1.

In some embodiments, step 104 can be executed repeatedly at time intervals of at least about 30 seconds, at least about 1 minute, at least about 2 minutes, at least about 3 minutes, at least about 4 minutes, at least about 5 minutes, at least about 6 minutes, at least about 7 minutes, at least about 8 minutes, at least about 9 minutes, at least about 10 minutes, at least about 15 minutes, at least about 20 minutes, or at least about 25 minutes. In some embodiments, step 104 can be executed repeatedly at time intervals of no more than about 30 minutes, no more than about 25 minutes, no more than about 20 minutes, no more than about 15 minutes, no more than about 10 minutes, no more than about 9 minutes, no more than about 8 minutes, no more than about 7 minutes, no more than about 6 minutes, no more than about 5 minutes, no more than about 4 minutes, no more than about 3 minutes, no more than about 2 minutes, or no more than about 1 minute. Combinations of the above-referenced time intervals for execution of step 104 are also possible (e.g., at least about 30 seconds and no more than about 30 minutes or at least about 5 minutes and no more than about 15 minutes, inclusive of all values and ranges therebetween. In some embodiments, step 104 can be executed repeatedly at time intervals of about 30 seconds, about 1 minute, about 2 minutes, about 3 minutes, about 4 minutes, about 5 minutes, about 6 minutes, about 7 minutes, about 8 minutes, about 9 minutes, about 10 minutes, about 15 minutes, about 20 minutes, about 25 minutes, or about 30 minutes.

In some embodiments, a quenching agent can be added to the portion of the product stream prior to step 106. In some embodiments, the quenching agent can be added during step 106. In some embodiments, the quenching agent can be added during step 106 in a separate stream from the diluent. In some embodiments, the quenching agent can be added during step 106 in the same stream as the diluent. In some embodiments, the quenching agent can be added to the sample after step 106. In some embodiments, a stoichiometric amount of the quenching agent can be added before step 106, during step 106, and/or after step 106. In other words, the quenching agent can be added in an appropriate amount to quench the product present in the portion of the product stream or in the sample. In some embodiments, an excess amount of the quenching agent can be added before step 106, during step 106, and/or after step 106. In some embodiments, a derivatizing agent can be added to the portion of the product stream prior to step 106. In some embodiments, the derivatizing agent can be added during step 106. In some embodiments, the derivatizing agent can be added during step 106 in a separate stream from the diluent. In some embodiments, the derivatizing agent can be added during step 106 in the same stream as the diluent. In some embodiments, the derivatizing agent can be added to the sample after step 106. In some embodiments, a stoichiometric amount of the derivatizing agent can be added before step 106, during step 106, and/or after step 106. In other words, the derivatizing agent can be added in an appropriate amount to quench the product present in the portion of the product stream or in the sample. In some embodiments, an excess amount of the derivatizing agent can be added either before step 106, during step 106, and/or after step 106. In some embodiments, a reaction solvent can be added to the mixing device before step 106, during step 106, and/or after step 106. In some embodiments, the quenching agent can be dissolved in the reaction solvent. In some embodiments, the derivatizing agent can be dissolved in the reaction solvent.

In some embodiments, the mixing device can be flushed with inert gas prior to step 106. In some embodiments, the mixing device can be flushed with inert gas after step 106. In some embodiments, the inert gas can include nitrogen, helium, argon, or any combinations thereof.

The sample produced in step 106 is transferred to an LC device at step 108. In some embodiments, the sample can be pumped through a valve or a series of valves that regulate flow to the LC device. In some embodiments, the sample can move through a series of tubes and/or pipes prior to reaching the LC device. In some embodiments, the sample can be filtered before reaching the LC device. In some embodiments, a portion of the sample can be diverted away from the LC device to a waste stream. In some embodiments, the sample can flow through a vial, where an LC needle autosampler withdraws an aliquot of sample and injects into the LC device for analysis. In some embodiments, the vial can include a transient flow vial. In some embodiments, the sample can flow through the transient flow vial via pneumatic pressure. In some embodiments, the sample can flow through an injection loop or flow cell, where a pump withdraws an aliquot of sample and injects into the LC device for analysis. In some embodiments, the sample can be injected into an LC device via a valve switch.

At step 110, the LC device develops a measured chemical profile of the sample. In some embodiments, the LC device can be a high performance liquid chromatography (HPLC) device. In some embodiments, the LC device can be an ultra-high performance liquid chromatography (UHPLC) device. In some embodiments, the LC device can be an ion exchange chromatography device, a size-exclusion chromatography device, an expanded bed adsorption chromatographic separation device, a reversed-phase chromatography device, a hydrophobic interaction chromatography device, a two-dimensional chromatography device, a simulated moving-bed (SMB) chromatography device, a fast protein liquid chromatography (FPLC) device, a counter current chromatography (CCC) device, a periodic counter-current chromatography (PCC) device, a chiral chromatography device, a bioaffinity chromatography device, an aqueous normal-phase chromatography device, or any combination thereof. In some embodiments, multiple LC devices can be used at step 110.

At step 112, the measured chemical profile developed in step 110 is analyzed. In some embodiments, the analysis method can include an asymmetric least squares smoothing method, Design of Experiment (DoE) analysis, a multivariate chemometric analysis method, a polynomial filter method, a principal components analysis method, a supervised pattern recognition method, an unsupervised pattern recognition method, a hierarchical clustering method, a linear quantification method, a quadratic quantification method, a cubic quantification method, a k-nearest neighbor method, a regression analysis method, a multivariate regression analysis method, Stable Noisy Optimization by Branch and FIT (SNOBFIT), deep reaction optimizer (DRO) Bayesian probabilistic optimizer (Phoenics), multi-objective Perato optimizer (Chimera) or any combination thereof.

At step 114, the analyzed chemical profile is compared to a desired chemical profile. In some embodiments, the desired chemical profile can be in the form of absolute LC peak area under the curve (AUC). In some embodiments, the desired chemical profile can be in the form of a quantified ratio (e.g., mass ratio, volumetric ratio, molar ratio) of a first product to a second product. In some embodiments, the desired chemical profile can be in the form of a quantified ratio of the first product to a sum of all other products.

If the measured chemical profile matches the desired chemical profile to within a designated margin of error, then the method 100 resumes unchanged from step 102. If the measured chemical profile does not match the desired chemical profile to within the designated margin of error, then step 116 is executed, which adjusts one or more parameters of the chemical reaction executed at step 102. In some embodiments, the designated margin of error can be a prescribed value. In some embodiments, the designated margin of error can be a rigid value. In some embodiments, the designated margin of error can be a fluid value that changes based on one or more factors present in the system (e.g., the reactor temperature, flow rate of a reagent A, etc.). In some embodiments, the designated margin of error can be at least about 0.1%, at least about 0.2%, at least about 0.3%, at least about 0.4%, at least about 0.5%, at least about 0.6%, at least about 0.7%, at least about 0.8%, at least about 0.9%, at least about 1%, at least about 2%, at least about 3%, at least about 4%, at least about 5%, at least about 6%, at least about 7%, at least about 8%, or at least about 9%. In some embodiments, the designated margin of error can be no more than about 10%, no more than about 9%, no more than about 8%, no more than about 7%, no more than about 6%, no more than about 5%, no more than about 4%, no more than about 3%, no more than about 2%, no more than about 1%, no more than about 0.9%, no more than about 0.8%, no more than about 0.7%, no more than about 0.6%, no more than about 0.5%, no more than about 0.4%, no more than about 0.3%, or no more than about 0.2%. Combinations of the above-referenced margin of error values are also possible (e.g., at least about 0.1% and no more than about 10% or at least about 1% and no more than about 5%), inclusive of all values and ranges therebetween. In some embodiments, the designated margin of error can be about 0.1%, about 0.2%, about 0.3%, about 0.4%, about 0.5%, about 0.6%, about 0.7%, about 0.8%, about 0.9%, about 1%, about 2%, about 3%, about 4%, about 5%, about 6%, about 7%, about 8%, about 9%, or about 10%.

In some embodiments, step 116 can include an adjustment of a pump rate of one or more reagents. In some embodiments, step 116 can include an adjustment of a flow rate of one or more reagents. In some embodiments, step 116 can include an adjustment of a valve to increase a flow rate, decrease a flow rate, or block flow of a reagent. In some embodiments, step 116 can include adjustment of a temperature of the reactor. In some embodiments, step 116 can include adding heat to the reactor. In some embodiments, step 116 can include removing heat from a reactor. In some embodiments, step 116 can include increasing reactor pressure. In some embodiments, step 116 can include pumping more gas into the reactor. In some embodiments, step 116 can include reducing or restricting flow of gas into the reactor. In some embodiments, step 116 can include modifying the amount of light incident upon the reactor. This can be via an increase in light intensity of an applied light source, a decrease in light intensity of an applied light source, and/or via an increase or decrease in shading. In some embodiments, step 116 can include an adjustment of a ratio of a first reagent to a second reagent. In some embodiments, step 116 can include an adjustment of a ratio of a first reagent to all other reagents.

Figure 2:
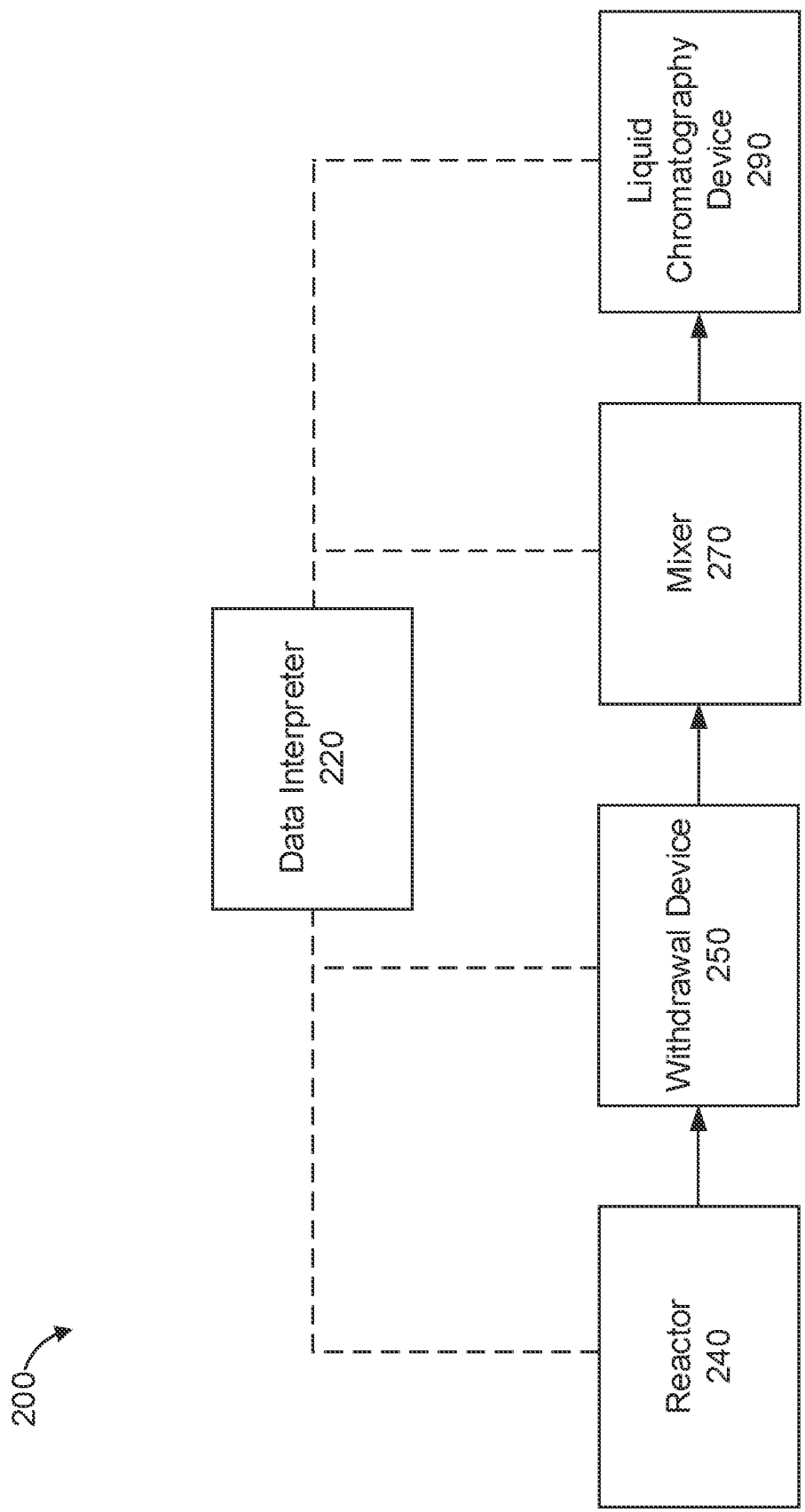
FIG. 2 is a schematic illustration of a system for implementation of online chromatographic sample dilution and preparation, according to an embodiment.

FIG. 2 is a schematic illustration of a system 200 for implementation of online chromatographic sample dilution and preparation, according to an embodiment. In some embodiments, the method 100, as described above with reference to FIG. 1, can be implemented using the system 200. As shown, the system 200 includes a data interpreter 220, a reactor 240, a withdrawal device 250, a mixer 270, and a liquid chromatography device 290 (hereinafter LC device 290). As shown, solid lines indicate physical couplings between units, arrows indicate flow of material from one unit to another, and dotted lines indicate a communicative connection between units (e.g., via wired or wireless data transmission).

The data interpreter 220 is a device, through which the control logic process to implement the method 100 can be executed. In some embodiments, the data interpreter 220 can be a computer, a smartphone, a tablet, a laptop, a remote controller, any other computing device, or combination thereof. In some embodiments, the data interpreter 220 can be communicatively connected to the other units of the system 200 via a wired connection, such as an Ethernet cable, a powerline adapter, power over long reach Ethernet (PoLRE), coaxial cable, or any other suitable wired connection or combinations thereof. In some embodiments, the wired connection can be an analog connection. In some embodiments, the data interpreter 220 can be communicatively connected to the other units of the system 200 via a wireless connection, such as WiFi or cellular (1×, 3G, 4G LTE, 5G). In some embodiments, the data interpreter 220 can be communicatively connected to a first unit via a wired connection and the data interpreter 220 can be communicatively connected to a second unit via a wireless connection. For example, the data interpreter 220 can be connected to the reactor 240 via a wired connection and the data interpreter 220 can be connected to the withdrawal device 250 via a wireless connection.

In some embodiments, the reactor 240 can include a CSTR, a PFR, a batch reactor, a semi-batch reactor, a photoreactor, a photobioreactor, a mixer, or any other suitable reactor type. In some embodiments, the reactor 240 can be a reactor that exhibits properties of more than one of the aforementioned reactor types. For example, the reactor 240 can be designed as a CSTR, but can exhibit concentration gradients within the main vessel of the CSTR, such that the reactor 240 has PFR properties. In some embodiments, the reactor 240 can include one or more inlet streams. In some embodiments, the reactor 240 can include one or more outlet streams. In some embodiments, the one or more inlet streams can deliver a reagent or reagents to the reactor 240. In some embodiments, the one or more outlet streams can transfer a product or products outside of the reactor. In some embodiments, the flow rate of inlet stream can be controlled via pumps, gravity, and/or valves. In some embodiments, the flow rate of outlet stream can be controlled via pumps, gravity, and/or valves. During operation of the system 200, any operational parameters of the reactor 240 can be adjusted. These operational parameters can include, but are not limited to: temperature, pressure, incident light on the reactor 240, flow rates into and/or out of the reactor 240. In some embodiments, the data interpreter 220 can adjust the operational parameters of the reactor 240.

The withdrawal device 250 withdraws a portion of a product stream from the reactor 240. In some embodiments, the data interpreter 220 can direct the volume of the portion of the product stream the withdrawal device 250 withdraws. In some embodiments, the volume of the portion of the product stream the withdrawal device 250 withdraws can be the same or substantially similar to the volume of the volume of the portion of the product stream withdrawn at step 104, as described above with reference to FIG. 1. In some embodiments, the pressure rating of the withdrawal device 250 can be the same or substantially similar to the pressure rating of the device employed at step 104, as described above with reference to FIG. 1. In some embodiments, the temperature rating of the withdrawal device 250 can be the same or substantially similar to the temperature rating of the device employed at step 104, as described above with reference to FIG. 1. In some embodiments, the withdrawal device 250 can include wetted parts. In some embodiments, the wetted parts can be composed of alloy c-22, Polytetrafluoroethylene (PTFE), and/or any other suitable material.

In some embodiments, the withdrawal device 250 can include an inlet port that receives a diluent. In other words, the inlet port that receives the diluent can be fluidically coupled to a reservoir of diluent (not shown). In some embodiments, the diluent can be added to the withdrawal device 250, as described above in step 106, with reference to FIG. 1. In some embodiments, the withdrawal device 250 can include an inlet port that receives a quenching agent. In other words, the inlet port that receives the quenching agent can be fluidically coupled to a reservoir of quenching agent (not shown). In some embodiments, the quenching agent can be added to the withdrawal device 250 before, during, and/or after step 106, as described above with reference to FIG. 1.

In some embodiments, the withdrawal device 250 can include an inlet port that receives a reaction solvent. In other words, the inlet port that receives the reaction solvent can be fluidically coupled to a reservoir of reaction solvent (not shown). In some embodiments, the reaction solvent can be added to the withdrawal device 250 before, during, and/or after step 106, as described above with reference to FIG. 1. In some embodiments, the withdrawal device 250 can include an inlet port that receives a derivatizing agent. In other words, the inlet port that receives the derivatizing agent can be fluidically coupled to a reservoir of derivatizing agent (not shown). In some embodiments, the derivatizing agent can be added to the withdrawal device 250 before, during, and/or after step 106, as described above with reference to FIG. 1. In some embodiments, the flow rate of the diluent, the quenching agent, the reaction solvent, and/or the derivatizing agent can be directed by the data interpreter 220.

The mixer 270 aids in mixing the portion of the product stream with the diluent to form a sample. In some embodiments, the mixer 270 can include one or more inlet streams. In some embodiments, the mixer 270 can include an inlet stream from the withdrawal device 250. In some embodiments, the mixer 270 can include an inlet stream from a reservoir of inert gas (not shown). In some embodiments, the mixer 270 can include one or more outlet streams. In some embodiments, the mixer 270 can include an outlet stream that that is a waste stream. In some embodiments, the mixer 270 can include an outlet stream that is an exhaust stream. In some embodiments, the mixer 270 can include an outlet stream that feeds to the LC device 290. In some embodiments, the mixer 270 can be composed of an inert material, such as glass. In some embodiments, the mixer 270 can include perfluoralkoxy alkane (PFA) connection seals. In some embodiments, the mixer 270 can include a clean-in-place mechanism.

In some embodiments, the mixer 270 can have a volume of at least about 1 mL, at least about 2 mL, at least about 3 mL, at least about 4 mL, at least about 5 mL, at least about 6 mL, at least about 7 mL, at least about 8 mL, at least about 9 mL, at least about 10 mL, at least about 20 mL, at least about 30 mL, at least about 40 mL, at least about 50 mL, at least about 60 mL, at least about 70 mL, at least about 80 mL, at least about 90 mL, at least about 100 mL, at least about 200 mL, at least about 300 mL, at least about 400 mL, at least about 500 mL, at least about 600 mL, at least about 700 mL, at least about 800 mL, at least about 900 mL, at least about 1 L, at least about 2 L, at least about 3 L, at least about 4 L, at least about 5 L, at least about 6 L, at least about 7 L, at least about 8 L, at least about 9 L, or at least about 10 L. In some embodiments, the mixer 270 can have a volume of no more than about 10 L, no more than about 9 L, no more than about 8 L, no more than about 7 L, no more than about 6 L, no more than about 5 L, no more than about 4 L, no more than about 3 L, no more than about 2 L, no more than about 1 L, no more than about 900 mL, no more than about 800 mL, no more than about 700 mL, no more than about 600 mL, no more than about 500 mL, no more than about 400 mL, no more than about 300 mL, no more than about 200 mL, no more than about 100 mL, no more than about 90 mL, no more than about 80 mL, no more than about 70 mL, no more than about 60 mL, no more than about 50 mL, no more than about 40 mL, no more than about 30 mL, no more than about 20 mL, no more than about 10 mL, no more than about 9 mL, no more than about 8 mL, no more than about 7 mL, no more than about 6 mL, no more than about 5 mL, no more than about 4 mL, no more than about 3 mL, or no more than about 2 mL. Combinations of the above-referenced volumes of the mixer 270 are also possible (e.g. at least about 1 mL and no more than about 10 L or at least about 10 mL and no more than about 50 mL), inclusive of all values and ranges therebetween. In some embodiments, the mixer 270 can have a volume of about 1 mL, about 2 mL, about 3 mL, about 4 mL, about 5 mL, about 6 mL, about 7 mL, about 8 mL, about 9 mL, about 10 mL, about 20 mL, about 30 mL, about 40 mL, about 50 mL, about 60 mL, about 70 mL, about 80 mL, about 90 mL, about 100 mL, about 200 mL, about 300 mL, about 400 mL, about 500 mL, about 600 mL, about 700 mL, about 800 mL, about 900 mL, about 1 L, about 2 L, about 3 L, about 4 L, about 5 L, about 6 L, about 7 L, about 8 L, about 9 L, or about 10 L.

In some embodiments, the mixer 270 can include an inlet port that receives the diluent. In other words, the inlet port that receives the diluent can be fluidically coupled to a reservoir of diluent (not shown). In some embodiments, the diluent can be added to the mixer 270, as described above in step 106, with reference to FIG. 1. In other words, the inlet port that receives the quenching agent can be fluidically coupled to a reservoir of quenching agent (not shown). In some embodiments, the quenching agent can be added to the mixer 270 before, during, and/or after step 106, as described above with reference to FIG. 1. In some embodiments, the mixer 270 can include an inlet port that receives the reaction solvent. In other words, the inlet port that receives the reaction solvent can be fluidically coupled to a reservoir of reaction solvent (not shown). In some embodiments, the reaction solvent can be added to the mixer 270 before, during, and/or after step 106, as described above with reference to FIG. 1. In some embodiments, the mixer 270 can include an inlet port that receives the derivatizing agent. In other words, the inlet port that receives the derivatizing agent can be fluidically coupled to a reservoir of derivatizing agent (not shown). In some embodiments, the derivatizing agent can be added to the mixer 270 before, during, and/or after step 106, as described above with reference to FIG. 1. In some embodiments, the flow rate of the diluent, the quenching agent, the reaction solvent, and/or the derivatizing agent can be directed by the data interpreter 220.

The mixer 270 delivers the sample to the LC device 290. In some embodiments, as described above in step 110 with reference to FIG. 1, the LC device 290 can be an HPLC device, a UHPLC device, an ion exchange chromatography device, a size-exclusion chromatography device, an expanded bed adsorption chromatographic separation device, a reversed-phase chromatography device, a hydrophobic interaction chromatography device, a two-dimensional chromatography device, an SMB chromatography device, an FPLC device, a CCC device, a PCC device, a chiral chromatography device, a bioaffinity chromatography device, an aqueous normal-phase chromatography device, or any combination thereof. In some embodiments, the sample run in the LC device 290 can be initiated by the data interpreter 220. In some embodiments, multiple samples can be run in the LC device 290 simultaneously. In some embodiments, a second sample can be transferred to the LC device 290 while a first sample is running in the LC device 290.

Figure 3:
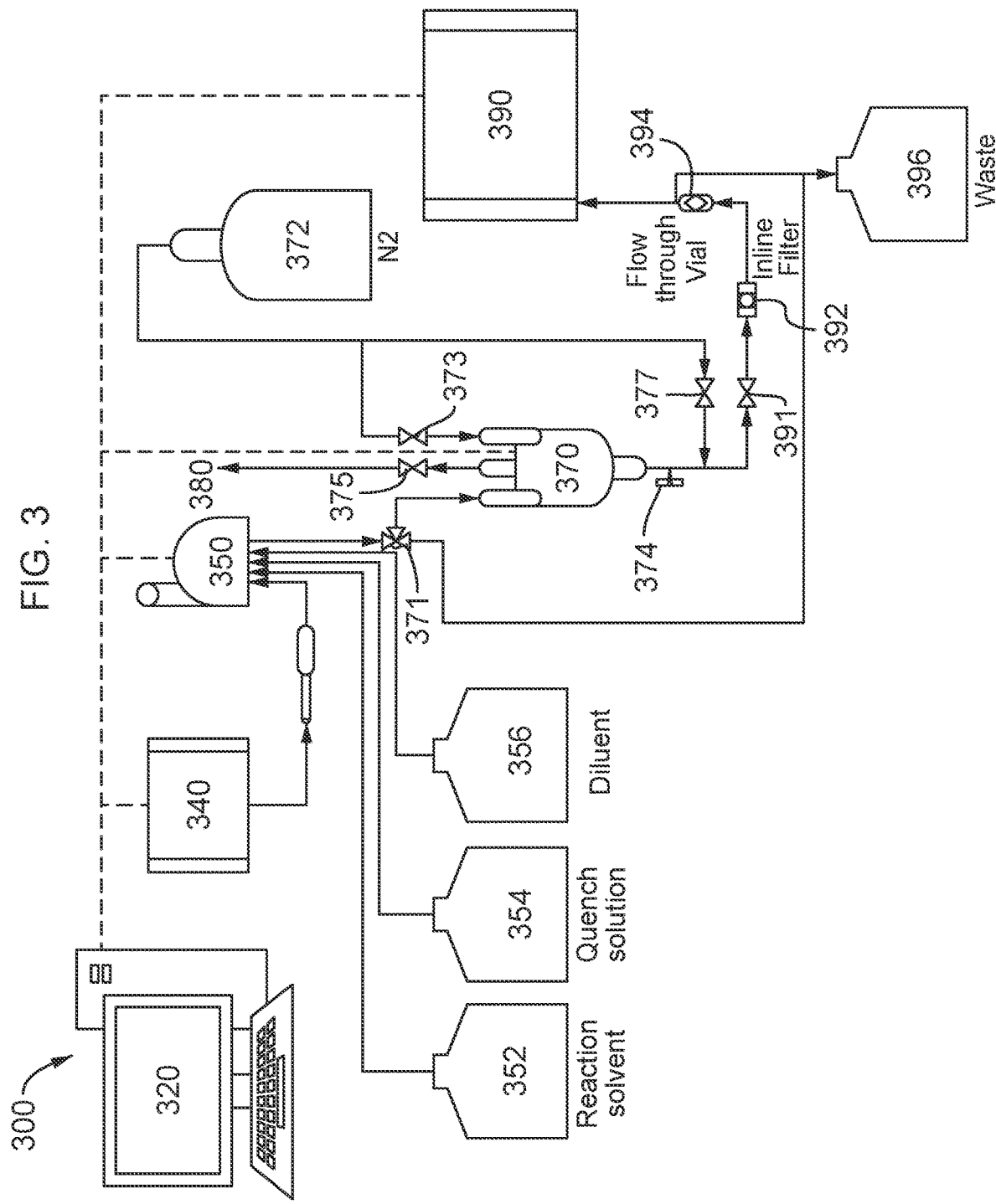
FIG. 3 is a schematic illustration of a system for implementation of online chromatographic sample dilution and preparation, according to an embodiment.

FIG. 3 is a schematic illustration of a system 300 for implementation of online chromatographic sample dilution and preparation, according to an embodiment. The system 300 includes a data interpreter 320, a reactor 340, a withdrawal device 350, a mixer 370, and a liquid chromatography device 390 (hereinafter LC device 390). In some embodiments, the data interpreter 320, the reactor 340, the withdrawal device 350, the mixer 370, and the LC device 390 can be the same or substantially similar to the data interpreter 220, the reactor 240, the withdrawal device 250, the mixer 270, and the LC device 290, as described above with reference to FIG. 2. Thus, certain aspects of the data interpreter 320, the reactor 340, the withdrawal device 350, the mixer 370, and the LC device 390 are not described in greater detail herein. As shown, solid lines indicate physical couplings between units, arrows indicate flow of material from one unit to another, and dotted lines indicate a communicative connection between units (e.g., via wired or wireless data transmission).

As shown, the withdrawal device 350 includes inlet streams from a reaction solvent reservoir 352, a quench solution reservoir 354, and a diluent reservoir 356. In some embodiments, the withdrawal device 350 can include an inlet stream from a derivatization agent reservoir (not shown). In some embodiments, the derivatization agent can be included in the quench solution reservoir 354. In some embodiments, the derivatization agent can be included in the diluent reservoir 356.

The withdrawal device 350 is fluidically coupled to the mixer 370. The withdrawal device 350 transfers fluid to the mixer 370. In some embodiments, a valve 371 can divert a portion of the sample to a waste reservoir 396. In some embodiments, the valve 371 can be a 3-way valve with a first port fluidically coupled to the withdrawal device 350, a second port fluidically coupled to the mixer 370, and a third port fluidically coupled to the waste reservoir 396. The mixer 370 mixes the portion of the product stream, diluent, derivatization agent, quenching agent, and/or reaction solvent to form a sample. As shown, the mixer 370 include inlets from an inert gas tank 372 (regulated by valve 373) and the withdrawal device 350 (regulated by valve 371) as well as outlets to exhaust 380 (regulated by valve 375) and to the LC device 390 (regulated by valve 391). As shown, the inert gas tank 372 can is fluidically coupled to a point downstream of the mixer 370 (regulated by valve 377). In some embodiments, the data interpreter 320 can control the valves 371, 373, 375, 377, 391 to regulate flow through the valves 371, 373, 375, 377, 391.

The mixer 370 transfers the sample to the LC device 390. As shown, the sample moves from the mixer 370 to the LC device 390 through a bubble sensor 374, the valve 391, an inline filter 392, and a vial 394. The bubble sensor 374 detects whether effluent from the mixer 370 includes a bubble. Based on data interpreted from the bubble sensor 374, the data interpreter 320 can adjust one or more of the valves 371, 373, 375, 377, 391 in order to monitor the amount of sample remaining in the flow vial 370. The inline filter 392 can remove particulates and/or bacteria from the sample prior to entering the LC device 390. The vial 394 can temporarily store an analysis-ready sample prior to being fed to LC device 390. In some embodiments, a liquid portion of the sample can be diverted to the waste reservoir 396. In some embodiments, the LC device 390 can include a high-pressure injection portion, decoupled, or fluidically isolated from a low-pressure sampling portion. In some embodiments, the LC device 390 can be configured for flow chemistry monitoring. In other words, the LC device 390 can be used with flow reactors, such as a CSTR or a PFR. In some embodiments, the LC device 390 can be used with a batch or semi-batch reactor. In some embodiments, the LC device 390 can include a filter station and a dissolution tester. In some embodiments, the dissolution tester can be configured to fractionate and analyze incoming samples.

Figure 4A:
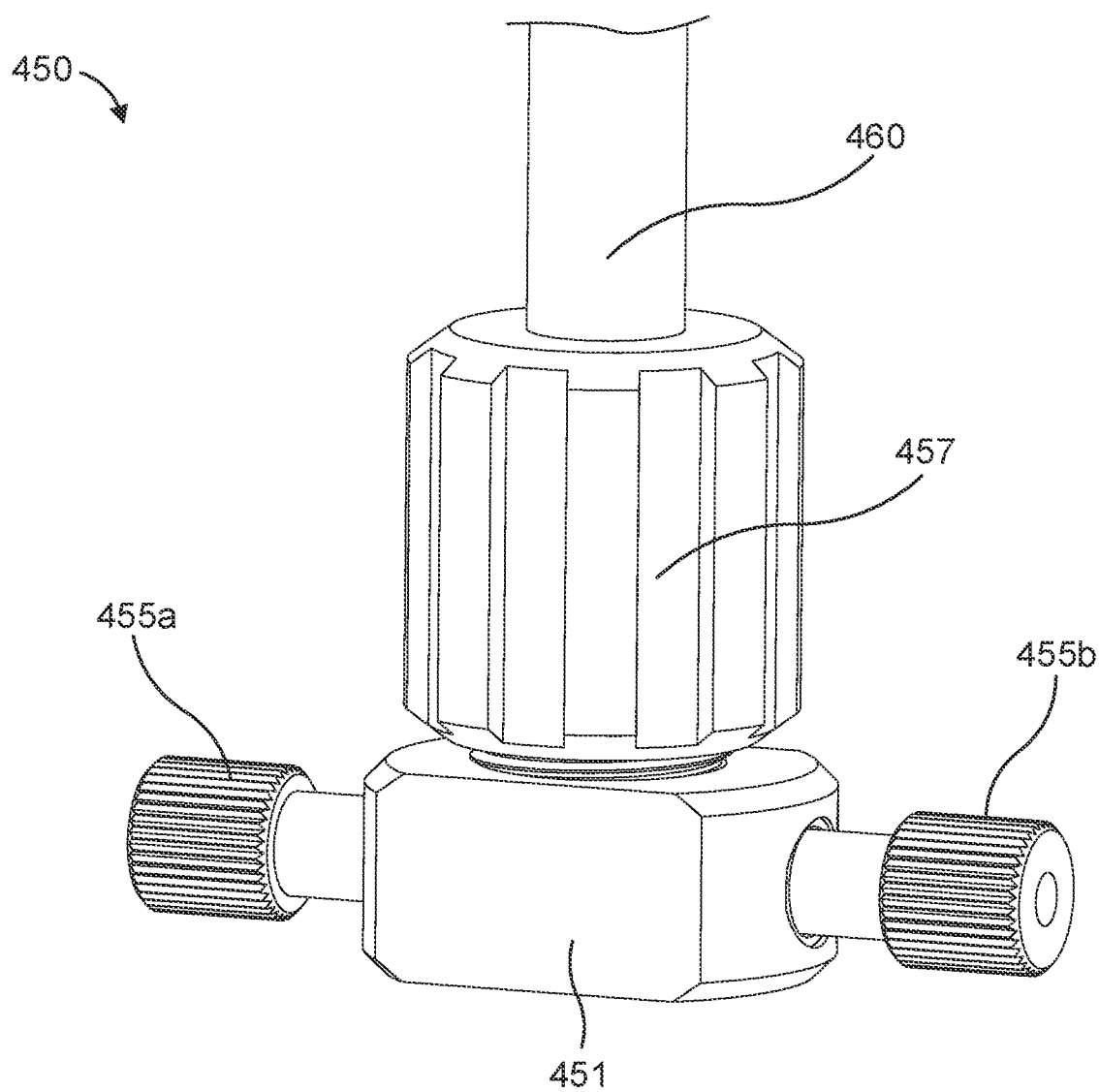
FIGS. 4A-4B are illustrations of a sampling device, according to an embodiment.
Figure 4B:
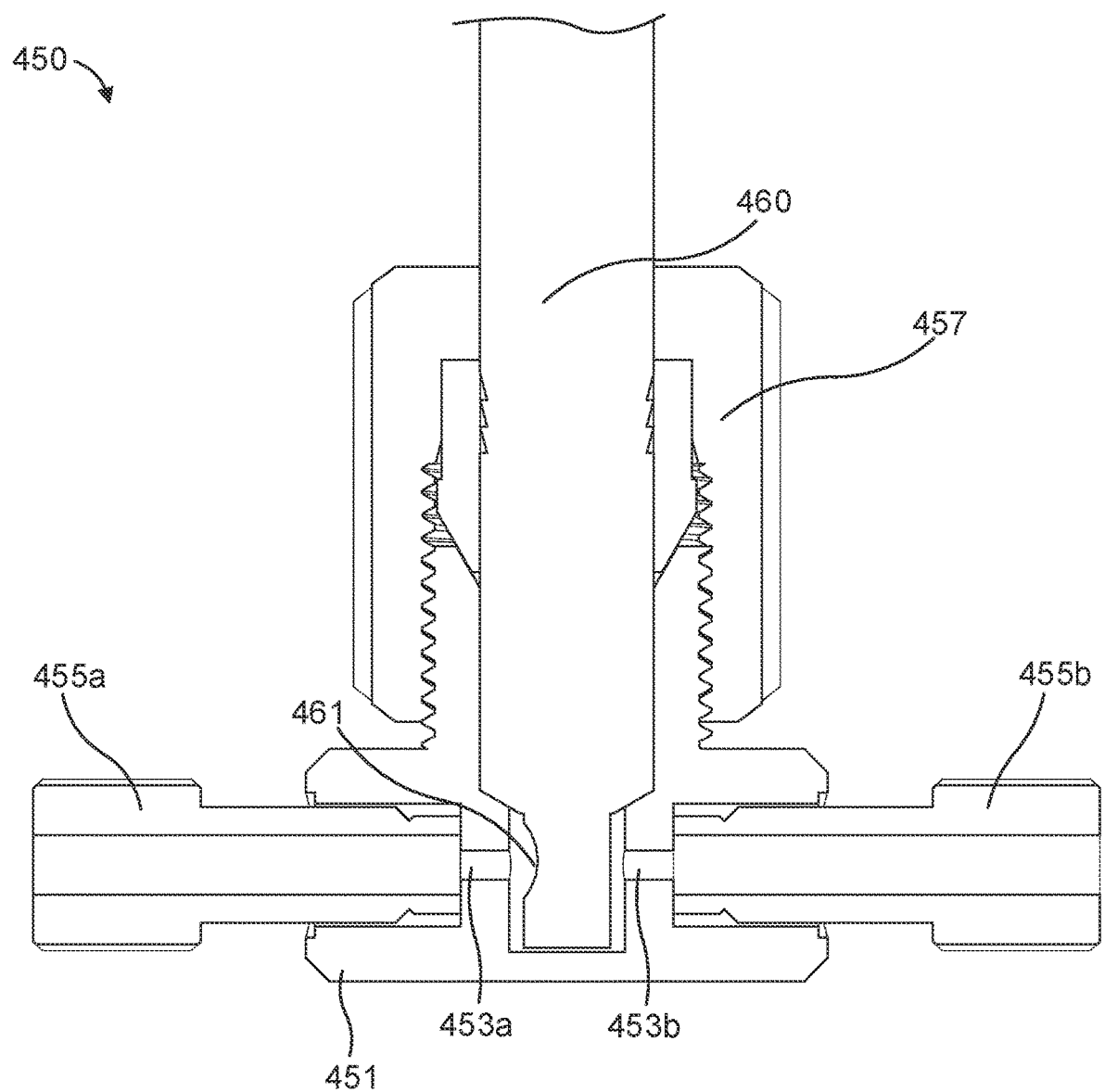

FIGS. 4A-4B are illustrations of a sampling device 450, according to an embodiment. FIG. 4A shows a perspective view of the sampling device 450, while FIG. 4B shows a cross-sectional view of the sampling device 450. In some embodiments, the sampling device 450 can be the same or substantially similar to the sampling device 250 or the sampling device 350, as described above with reference to FIG. 2 and FIG. 3. Thus, certain aspects of the sampling device 450 are not described in greater detail herein. As shown, the sampling device 450 includes a base 451 with sample openings 453a, 453b (collectively referred to as sample openings 453), injection ports 455a, 455b (collectively referred to as injection ports 455), a casing 457, and a probe 460 (including probe opening 461).

In some embodiments, the sampling device 450 can be optimized via computed fluid dynamics to ensure that the sampling device 450 withdraws a representative portion of the product stream and does not withdraw from a point of locally rich concentration or locally sparse concentration. In some embodiments, the sampling device 450 can be optimized via computed fluid dynamics to minimize carryover from one sample to the next. In some embodiments, sample carryover from a first sample to a second sample can be less than about 5%, less than about 4%, less than about 3%, less than about 2%, less than about 1%, less than about 0.9%, less than about 0.8%, less than about 0.7%, less than about 0.6%, less than about 0.5%, less than about 0.4%, less than about 0.3%, less than about 0.2%, or less than about 0.1%.

In some embodiments, the sampling device 450 can be designed to minimize dead volume. In some embodiments, the sampling device 450 can be integrated into a reactor block. In some embodiments, the sample openings 453 can be sufficiently small to limit dead volume in the sampling device 450. In some embodiments, tips of the injection ports 455 can be abutted to an inner surface of the base 451. In some embodiments, the sample openings 453 can each be cylindrical openings with a diameter of less than about 2 mm, less than about 1.9 mm, less than about 1.8 mm, less than about 1.7 mm, less than about 1.6 mm, less than about 1.5 mm, less than about 1.4 mm, less than about 1.3 mm, less than about 1.2 mm, less than about 1.1 mm, less than about 1 mm, less than about 900 µm, less than about 800 µm, less than about 700 µm, less than about 600 µm, less than about 500 µm, less than about 400 µm, less than about 300 µm, less than about 200 µm, less than about 100 µm. In some embodiments, the sample opening 453a can be an inlet. In some embodiments, the sample opening 453b can be an outlet.

In some embodiments, the probe 460 can rotate within the base 451, such that the probe opening 461 can face either of the injection ports 455. As shown, the sampling device 450 includes two injection ports 455. In some embodiments, the sampling device 450 can include 1, 2, 3, 4, 5, 6, 7, 8, 9, or 10 injection ports 455, inclusive of all ranges and subranges therebetween. As shown, the sampling device 450 includes two sample openings 451. In some embodiments, the sampling device 450 can include 1, 2, 3, 4, 5, 6, 7, 8, 9, or 10 sample openings 451, inclusive of all ranges and subranges therebetween. In some embodiments, the sampling device 450 or components thereof can be constructed of inert materials. In some embodiments, the base 451, injection ports 455, and/or casing 457 can be composed of PTFE, PFA, or any other inert material.

Figure 5A:
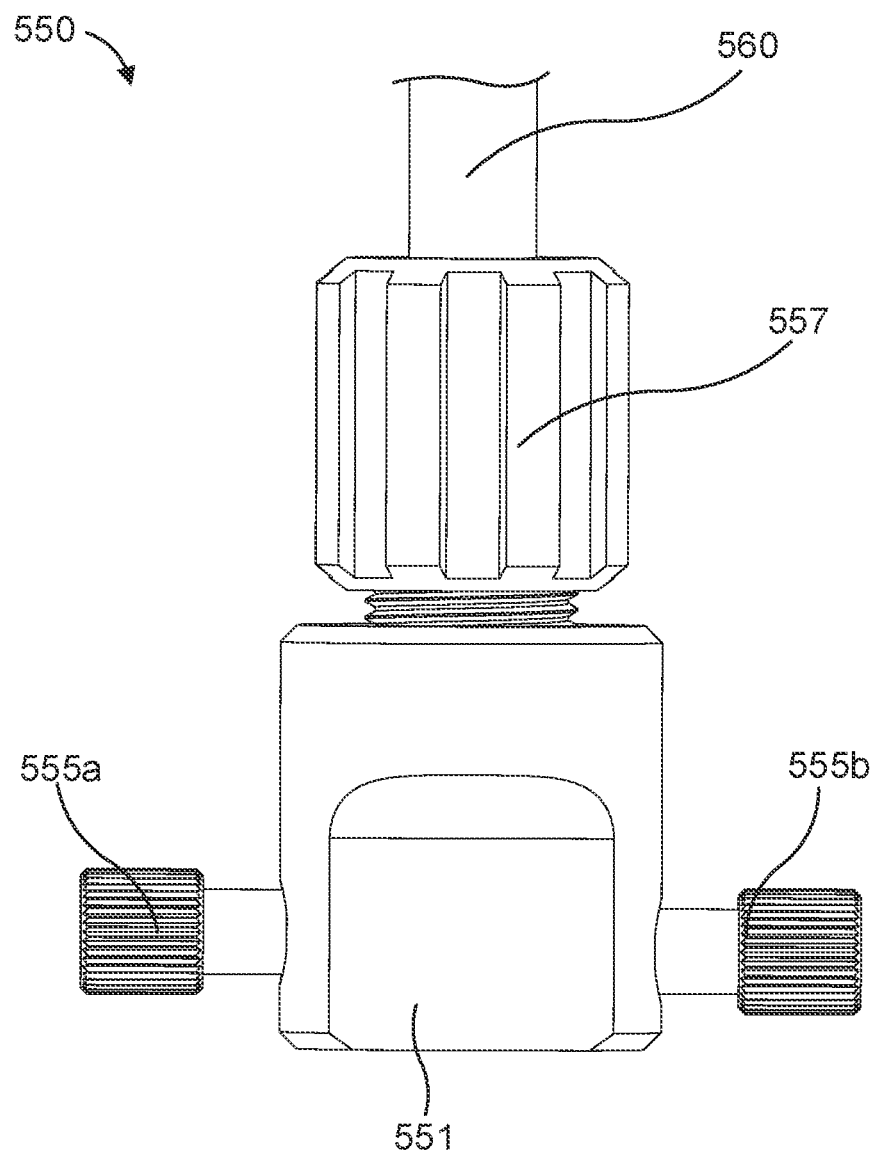
FIGS. 5A-5B are illustrations of a sampling device, according to an embodiment.
Figure 5B:
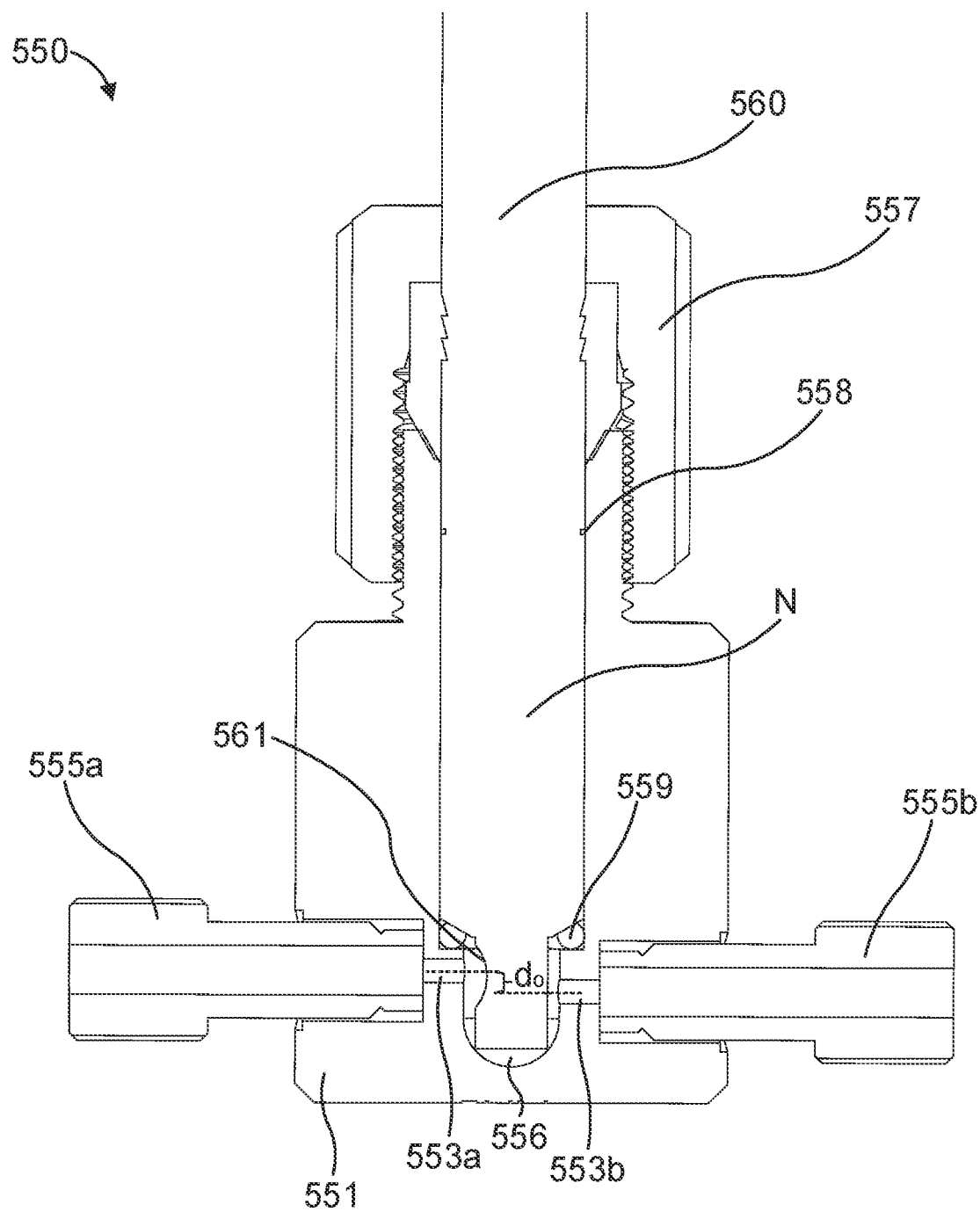

FIGS. 5A-5B are illustrations of a sampling device 550, according to an embodiment. FIG. 5A shows a perspective view of the sampling device 550, while FIG. 5B shows a cross-sectional view of the sampling device 550. As shown, the sampling device 550 includes a base 551 with sample openings 553a, 553b (collectively referred to as sample openings 553), injection ports 555a, 555b (collectively referred to as injection ports 555), a cavity 556, a casing 557, a ferrule 558, a sealing member 559, and a probe 560 (including probe opening 561). In some embodiments, the base 551, the sample openings 553, the injection ports 555, the casing 557, the probe 560, and the probe opening 561 can be the same or substantially similar to the base 451, the sample openings 453, the injection ports 455, the casing 457, the probe 460, and the probe opening 461, as described above with reference to FIGS. 4A-4B. Thus, certain aspects of the base 551, the sample openings 553, the injection ports 555, the casing 557, the probe 560, and the probe opening 561 are not described in greater detail herein.

As shown, the sample opening 553a is offset from the sample opening 553b by an offset distance do. In other words, there is an offset between an inlet to the sampling device 550 and an outlet from the sampling device 550. Offsetting the sample openings 553 from one another can facilitate faster equilibration of concentration of chemical species in the sampling device 550 (e.g., in the cavity 556). In some embodiments, the offset distance do can be at least about 50 μm, at least about 100 μm, at least about 200 μm, at least about 300 μm, at least about 400 μm, at least about 500 μm, at least about 600 μm, at least about 700 μm, at least about 800 μm, at least about 900 μm, at least about 1 mm, at least about 2 mm, at least about 3 mm, at least about 4 mm, at least about 5 mm, at least about 6 mm, at least about 7 mm, at least about 8 mm, at least about 9 mm, at least about 1 cm, at least about 2 cm, at least about 3 cm, or at least about 4 cm. In some embodiments, the offset distance do can be no more than about 5 cm, no more than about 4 cm, no more than about 3 cm, no more than about 2 cm, no more than about 1 cm, no more than about 9 mm, no more than about 8 mm, no more than about 7 mm, no more than about 6 mm, no more than about 5 mm, no more than about 4 mm, no more than about 3 mm, no more than about 2 mm, no more than about 1 mm, no more than about 900 μm, no more than about 800 μm, no more than about 700 μm, no more than about 600 μm, no more than about 500 μm, no more than about 400 μm, no more than about 300 μm, no more than about 200 μm, or no more than about 100 μm.

Combinations of the above-referenced values of the offset distance do are also possible (e.g., at least about 50 μm and no more than about 5 cm or at least about 100 μm and no more than about 500 μm), inclusive of all values and ranges therebetween. In some embodiments, the offset distance do can be about 50 μm, about 100 μm, about 200 μm, about 300 μm, about 400 μm, about 500 μm, about 600 μm, about 700 μm, about 800 μm, about 900 μm, about 1 mm, about 2 mm, about 3 mm, about 4 mm, about 5 mm, about 6 mm, about 7 mm, about 8 mm, about 9 mm, about 1 cm, about 2 cm, about 3 cm, about 4 cm, or about 5 cm.

As shown, the ferrule 558 grips the probe 560, keeping the probe 560 from slipping longitudinally within the casing 557. As shown, the sealing member 559 seals the probe 560 against the cavity 556. In some embodiments, the sealing member 559 can include a gasket. In some embodiments, the sealing member 559 can include an O-ring. The cavity 556 is a section at the bottom of the space into which the probe 560 is placed. As shown, the cavity 556 has a rounded shape. In some embodiments, the cavity 556 can have a hemispherical shape. In some embodiments, the cavity 556 can have a rectangular shape with approximately right-angled edges (e.g., similar to the sampling device 450 described above with reference to FIGS. 4A-4B). In some cases, a rounded shape of the cavity 556 can encourage better mixing in the sampling device 550, such that the concentration of analyte placed into the sampling device 550 equilibrates faster, as compared to a rectangular shape. As shown, the probe 560 has an elongated neck N. The elongated neck N can aid in forming a better seal at the sealing member 559, as compared to a shorter neck. In some embodiments, the elongated neck N can have a length such that a distance between the sealing member 559 and an entry point at the top of the casing 557 is about 1 cm, about 2 cm, about 3 cm, about 4 cm, about 5 cm, about 6 cm, about 7 cm, about 8 cm, about 9 cm, about 10 cm, about 11 cm, about 12 cm, about 13 cm, about 14 cm, about 15 cm, about 16 cm, about 17 cm, about 18 cm, about 19 cm, or about 20 cm, inclusive of all values and ranges therebetween.

Figure 6:
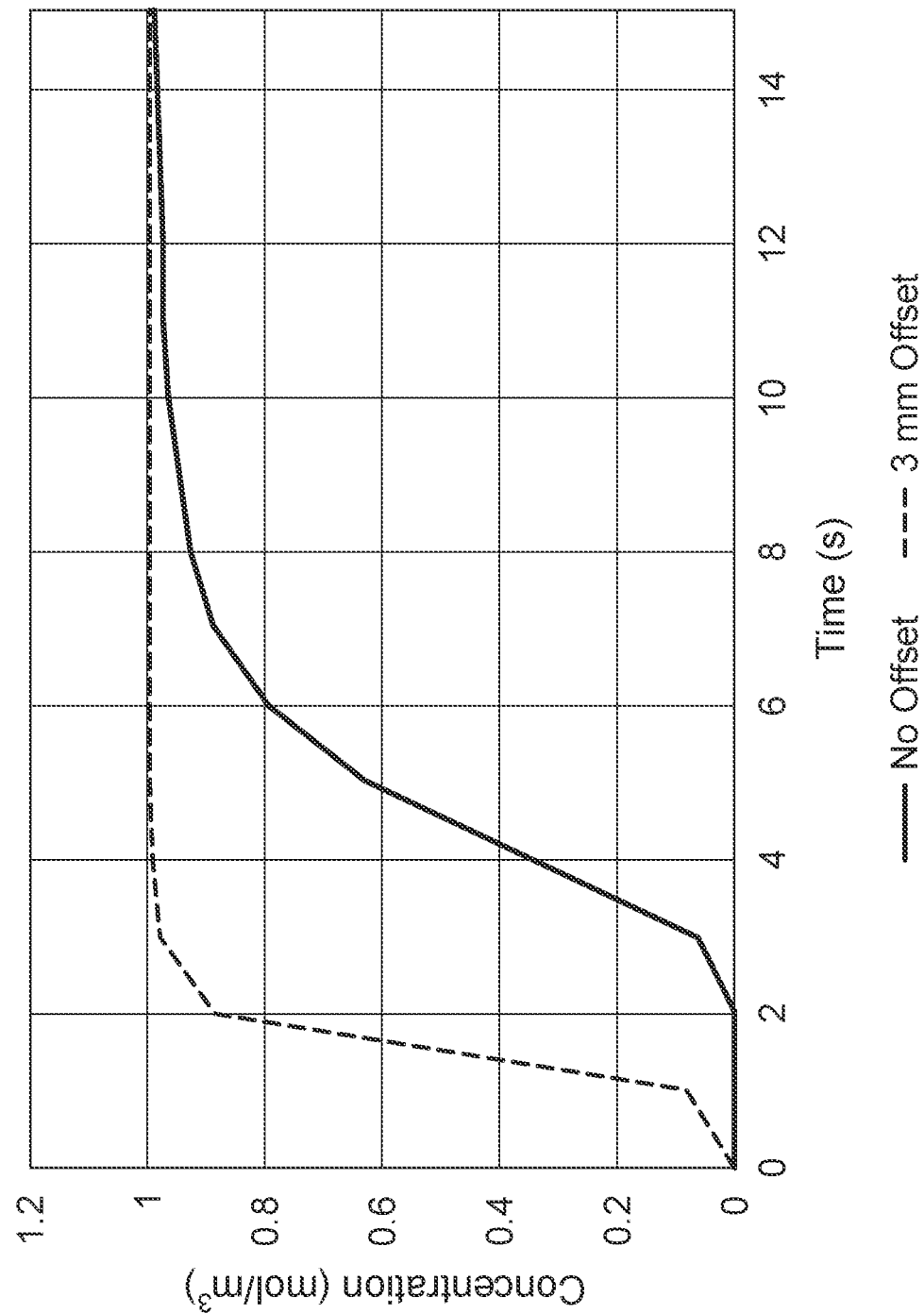
FIG. 6 is a plot of simulated concentrations in sampling devices without an opening offset and with an opening offset.

FIG. 6 is a plot of simulated concentrations in sampling devices without an opening offset and with an opening offset of 3 mm. The plot simulates concentrations of an analyte at an entry point into a sampling device (e.g., at the sample opening 453a or the sample opening 553a). The simulated sampling device starts with an analyte concentration of 0 mol/m$^3$ and is fed an analyte with a concentration of 1 mol/m$^3$ at a velocity of 12 cm/min. As shown, without the offset, the concentration of the analyte takes about 17 seconds to reach 99% equilibrium (i.e., 0.99 mol/m$^3$ at the opening). With the offset, the analyte only takes about 4 seconds to reach 99% equilibrium concentration.

Figure 7A:
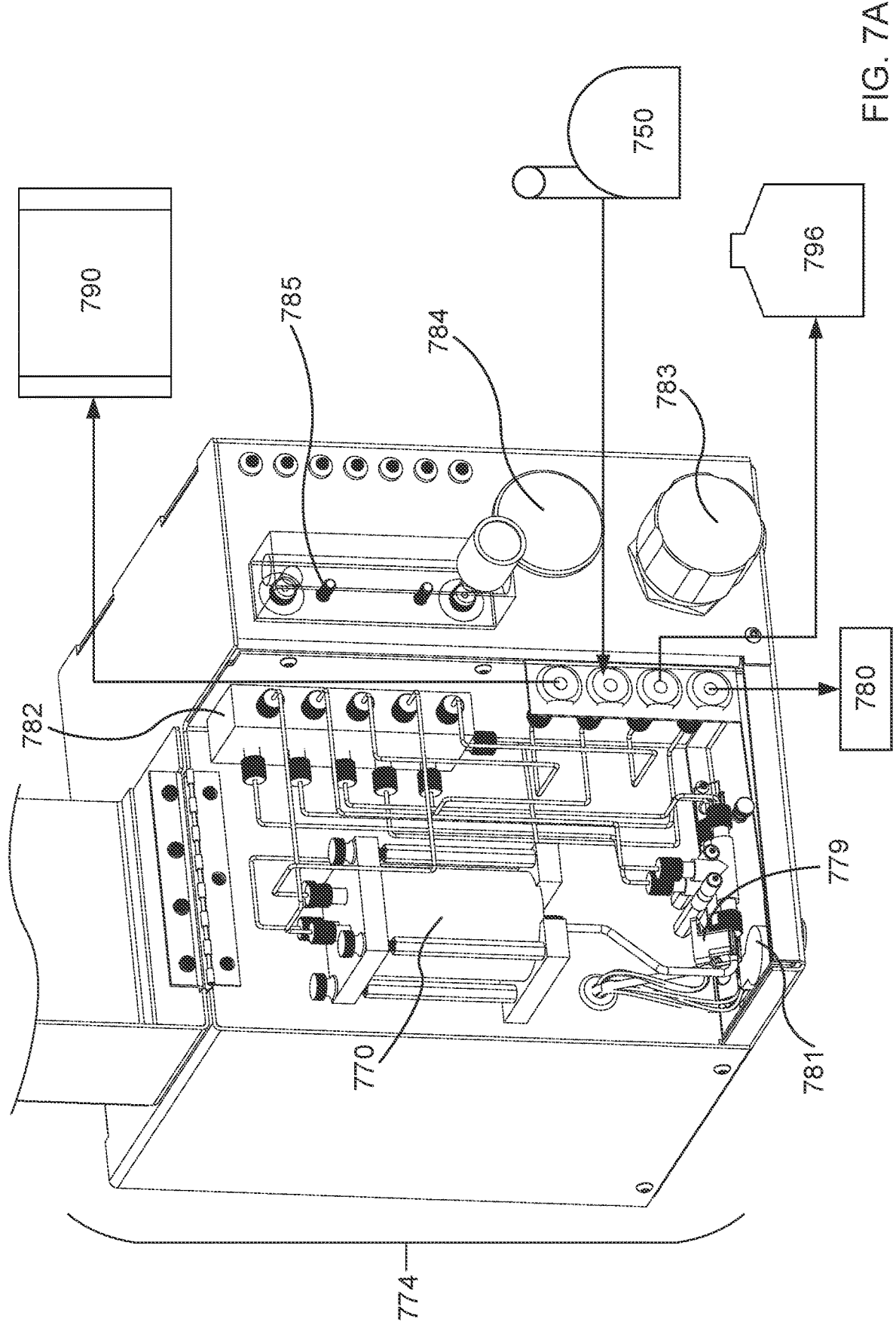
FIGS. 7A-7C are illustrations of portions of a system for implementation of online chromatographic sample dilution and preparation, according to an embodiment.
Figure 7B:
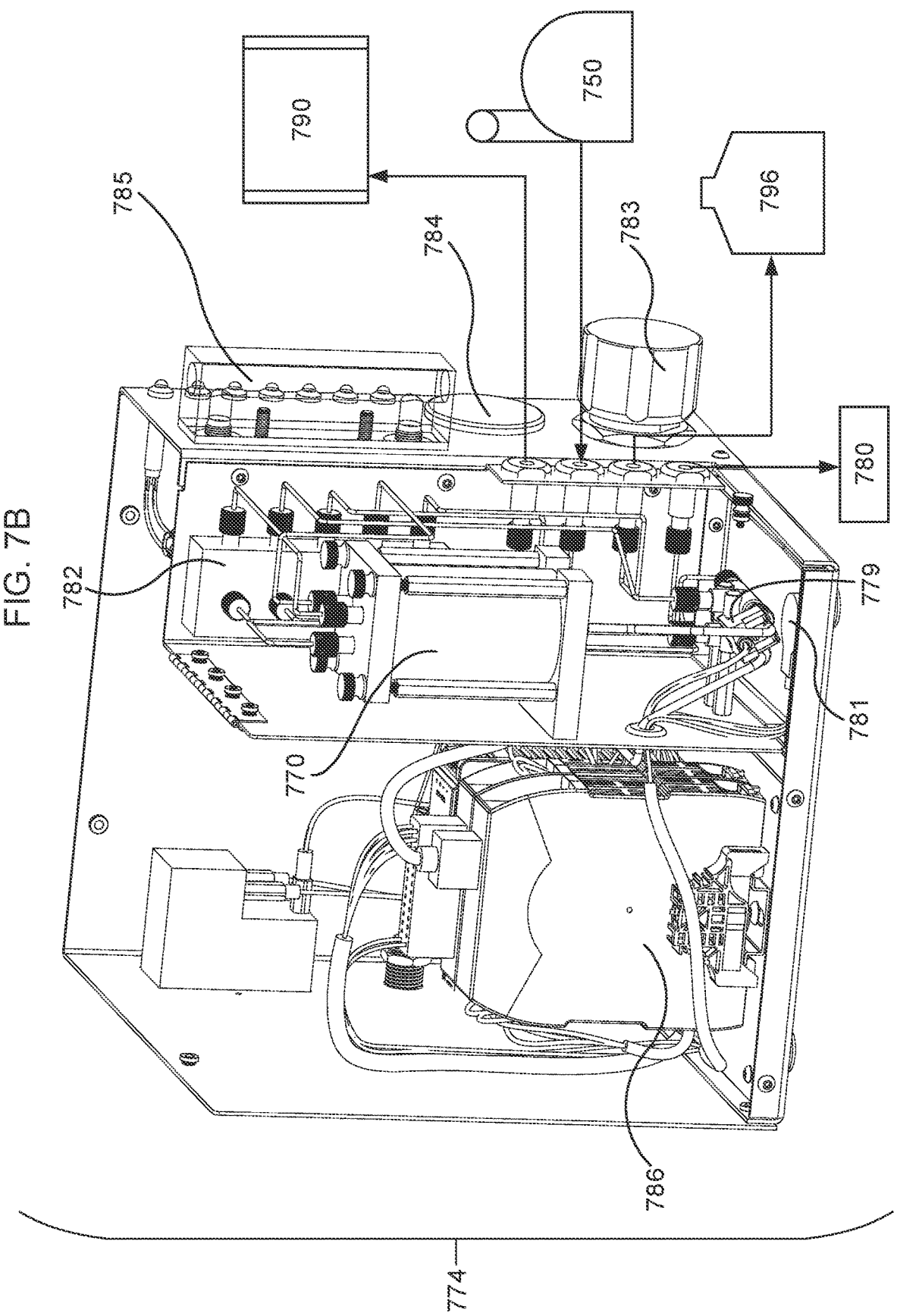
Figure 7C:
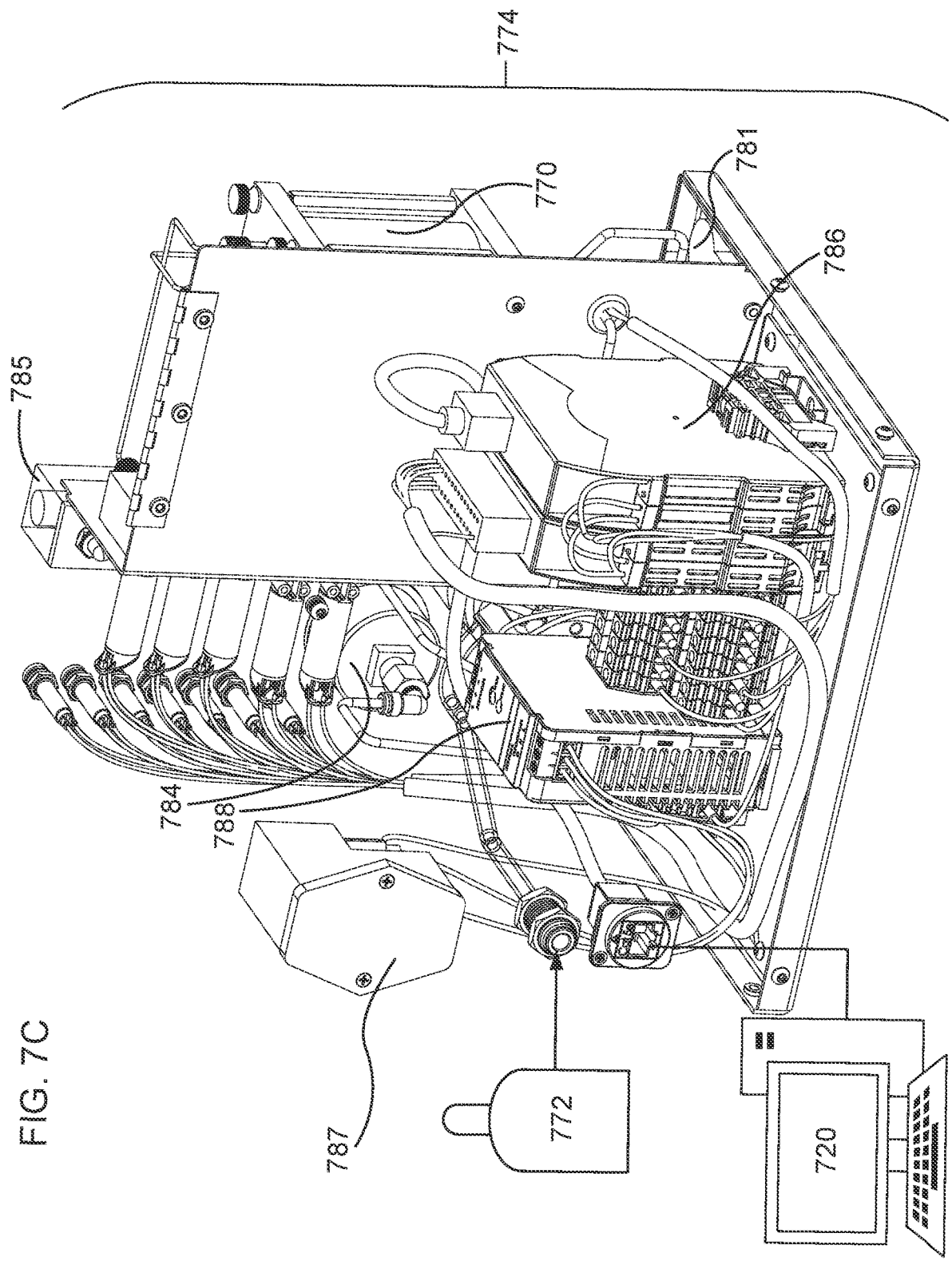

FIGS. 7A-7C show illustrations of portions of a system for implementation of online chromatographic sample dilution and preparation, according to an embodiment. Shown in FIGS. 7A-7C are a data interpreter 720, a withdrawal device 750, a mixing device 774, a gas tank 772, and an LC device 790. As shown, the mixing device 774 includes a mixer 770, a bubble sensor 779, a leak detector 781, a valve manifold 782, a pressure regulator 783, a pressure gauge 784, a gas flowmeter 785, a communication port 786, an AC outlet 787, and a power supply 788. In some embodiments, the data interpreter 720, the withdrawal device 750, the mixer 770, the gas tank 772, and the LC device 790 can be the same or substantially similar to the data interpreter 320, the withdrawal device 350, the mixer 370, the gas tank 372, and the LC device 390, as described above with reference to FIG. 3. Thus, certain aspects of the data interpreter 720, the withdrawal device 750, the mixer 770, the gas tank 772, and the LC device 790 are not described in greater detail herein.

As shown, the mixing device 774 includes an inlet that receives a sample from the withdrawal device 750 and an outlet that feeds to the LC device 790. The mixing device 774 also includes a vent that feeds to exhaust 780 and an outlet that feeds to a waste reservoir 796. The mixing device 774 also includes an inlet that receives gas from the gas tank 772. The mixing device 774 also includes a connection port that couples the data interpreter 720 to the communication port 786. In some embodiments, the mixer 770 can have the same or substantially similar properties as the mixer 270 described above, with reference to FIG. 2. In some embodiments, the mixer 770 can perform the same or substantially similar actions as the mixer 270 described above, with reference to FIG. 2. In some embodiments, the bubble sensor 779 can be the same or substantially similar to the bubble sensor 379, as described above with reference to FIG. 3.

In some embodiments, the leak detector 781 can communicate with the data interpreter 720 and/or the communication port 739 to shut off the mixing device 774 if a leak is detected. In some embodiments, the valve manifold 782 can include a collection of valves and ports that direct fluid flow between the withdrawal device 750 and the mixer 770, fluid flow between the gas tank 772 and the mixer 770, fluid flow between the mixer 770 and the LC device 790, and/or fluid flow between the mixer 770 and the waste reservoir 796. The pressure regulator 783 can reduce the pressure of the incoming gas from the gas tank 772, as gas fed from gas tanks is often kept at a higher pressure than desired in the mixing device 774. The pressure gauge 784 displays a pressure of the incoming gas and the gas flowmeter 785 monitors a flow rate of gas from the gas tank 772 into the mixing device 774 and the mixer 770.

In some embodiments, the communication port 786 can regulate operation of each of the components of the mixing device 774. In some embodiments, the communication port 786 can be communicatively coupled to the data interpreter 720. The A/C outlet 787 connects the mixing device 774 to an external power source, while the power supply 788 regulates power delivery throughout the mixing device 774.

FIG. 6 is a block diagram of an example embodiment of a data interpreter 620 upon which embodiments of the present disclosure can execute, and which is compatible with method 100 of FIG. 1, system 200 of FIG. 2, and system 300 of FIG. 3. Some embodiments of the present disclosure are implemented using computer-executable instructions, such as program modules, stored in a memory and executed on one or more processors operably coupled to the memory. Program modules can include routines, programs, objects, components, data structures, etc., that perform particular tasks or implement particular data types. As indicated above, the system as disclosed herein can be spread across many physical hosts.

Figure 8:
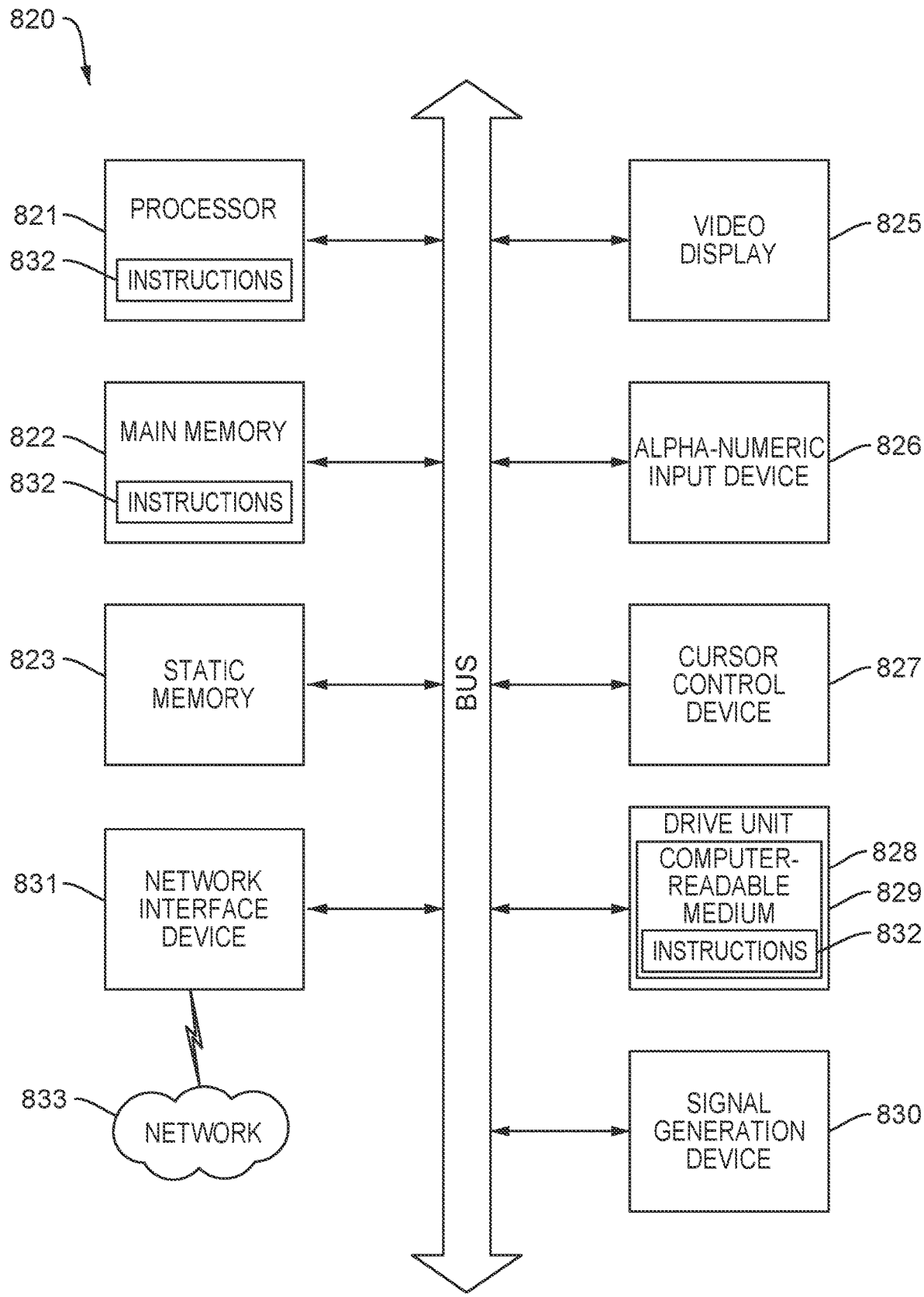
FIG. 8 is a block diagram of a computer system that can be used to implement the methods described herein, according to an embodiment.

With reference to FIG. 8, an example embodiment extends to a machine in the example form of the data interpreter 820 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

The example data interpreter 820 of FIG. 8 includes a processor 821 (e.g., a central processing unit (CPU), a graphics processing unit (GPU) or both), a main memory 822 and a static memory 823, which communicate with each other via a bus 824. The data interpreter 820 may further include a video display unit 825 (e.g., a liquid crystal display (LCD) or a cathode ray tube (CRT)). In example embodiments, the data interpreter 820 also includes one or more of an alpha-numeric input device 826 (e.g., a keyboard), a user interface (UI) navigation device or cursor control device 827 (e.g., a mouse), a disk drive unit 828, a signal generation device 830 (e.g., a speaker), and a network interface device 831.

The disk drive unit 828 includes a machine-readable medium 829 on which is stored one or more sets of instructions 832 and data structures (e.g., software instructions) embodying or used by any one or more of the methodologies or functions described herein. The instructions 832 may also reside, completely or at least partially, within the main memory 822 or within the processor 821 during execution thereof by the data interpreter 820, the main memory 822 and the processor 821, also constituting machine-readable media.

While the machine-readable medium 829 is shown in an example embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present disclosure, or that is capable of storing, encoding, or carrying data structures used by or associated with such instructions. The term "machine-readable storage medium" shall accordingly be taken to include, but not be limited to, solid-state memories and optical and magnetic media that can store information in a non-transitory manner, i.e., media that is able to store information. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

The instructions 832 may further be transmitted or received over a communications network 833 using a signal transmission medium via the network interface device 831 and utilizing any one of a number of well-known transfer protocols (e.g., FTP, HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "machine-readable signal medium" shall be taken to include any transitory intangible medium that is capable of storing, encoding, or carrying instructions for execution by the machine, and includes digital or analog communications signals or other intangible medium to facilitate communication of such software. In some embodiments, the second sample can include no peaks or substantially no peaks associated with the first sample.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM)

and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field programmable gate array (FPGA), a programmable logic controller (PLC), and/or an application specific integrated circuit (ASIC). Software modules (executed on hardware) can be expressed in a variety of software languages (e.g., computer code), including C, C++, Java™, ladder logic, Python™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code. Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisional s, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of" or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

While specific embodiments of the present disclosure have been outlined above, many alternatives, modifications, and variations will be apparent to those skilled in the art. Accordingly, the embodiments set forth herein are intended to be illustrative, not limiting. Various changes may be made without departing from the spirit and scope of the disclosure. Where methods and steps described above indicate certain events occurring in a certain order, those of ordinary skill in the art having the benefit of this disclosure would recognize that the ordering of certain steps may be modified and such modification are in accordance with the variations of the invention. Additionally, certain of the steps may be performed concurrently in a parallel process when possible, as well as performed sequentially as described above. The embodiments have been particularly shown and described, but it will be understood that various changes in form and details may be made.

Examples

Samples of analyte were collected with a sample collection device described herein, varying dilution factors ranging from 100 to 750. Five samples were collected at each dilution factor. The relative standard deviation (RSD) of each set was measured, and carryover from earlier samples was measured. Table 1 shows these data.

TABLE 1

| RSD and Carryover for Varying Dilution Factors | | |
|---|---|---|
| Set Dilution Factor | RSD (%) | Carryover (%) |
| 750 | 0.26 | 0.4 |
| 600 | 0.24 | 0.5 |
| 400 | 0.22 | 0.4 |
| 200 | 0.41 | 0.2 |
| 100 | 0.86 | 0.2 |

Figure 9:
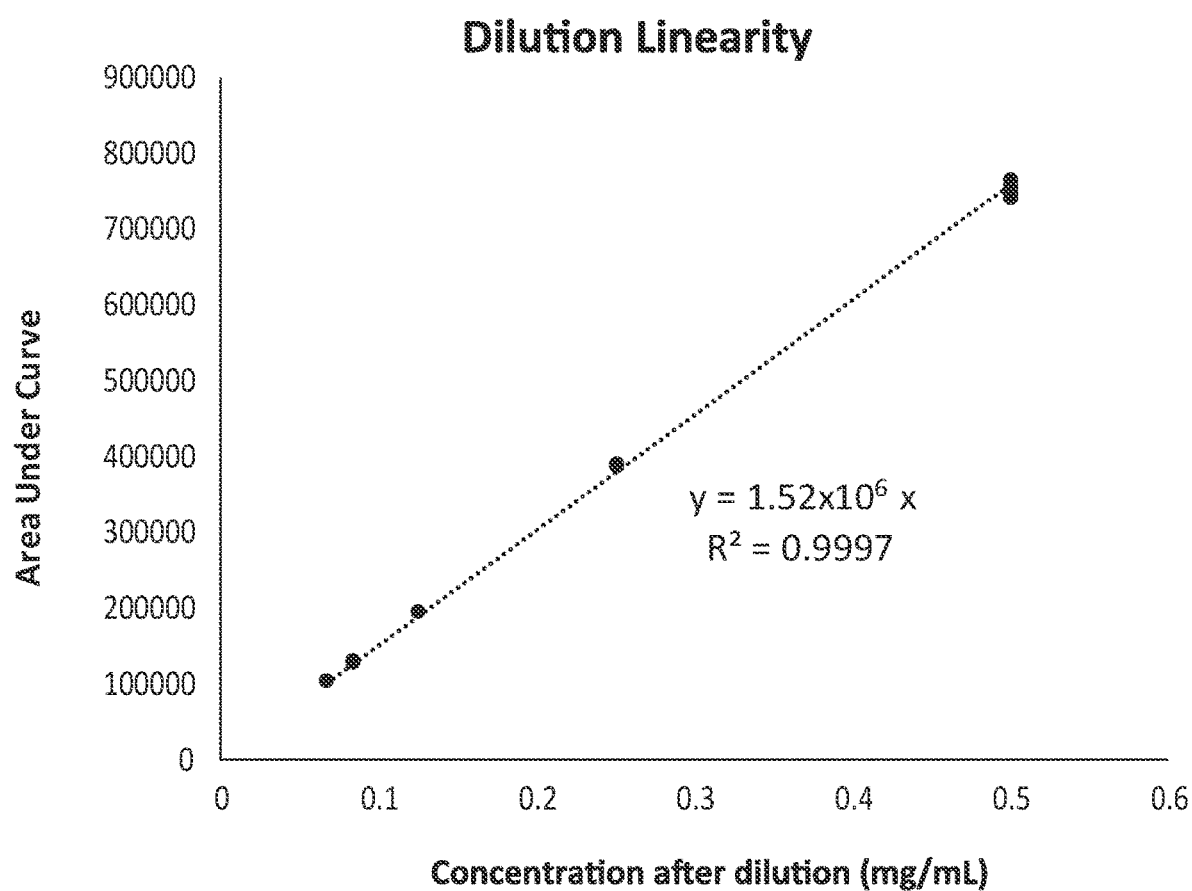
FIG. 9 is a plot of dilution linearity, as achieved with systems and methods described herein.

FIG. 9 shows a dilution linearity plot of the data from Table 1. As shown, the calculated area under curve gives a very strong correlation with the concentration after dilution.

The invention claimed is:

1. A computer-implemented method for analyzing a product stream of a chemical reaction, comprising:
    withdrawing via a mechanical scoop from a reactor, a portion of the product stream of the chemical reaction, the portion of the product stream having a volume of less than about 200 μL and a total suspended solids content of at least about 25 mg/L;
    mixing the portion of the product stream with a diluent to produce a sample;
    transferring the sample to a liquid chromatography device; and
    developing, via the liquid chromatography device, a measured chemical profile of the sample for process monitoring or real time decision-making.

2. The method of claim 1, further comprising:
    adjusting a reaction condition in the reactor based on differences between the measured chemical profile and a desired chemical profile.

3. The method of claim 2, wherein the reaction condition includes at least one of a pump rate, a flow rate, a temperature, a pressure, and an application of light.

4. The method of claim 1, wherein the diluent is added to the portion of the product stream at a ratio of at least about 50:1.

5. The method of claim 1, further comprising:
    quenching or derivatizing the portion of the product stream.

6. The method of claim 5, wherein quenching or derivatizing the portion of the product stream is at a temperature substantially the same as a temperature of the chemical reaction.

7. The method of claim 1, wherein the portion of the product stream has a volume of less than about 100 μL.

8. The method of claim 1, wherein the portion of the product stream has a volume of about 20 μL.

9. The method of claim 1, wherein the transferring comprises:
    flowing the sample through a transient flow vial on a liquid chromatography autosampler via pneumatic pressure.

10. The method of claim 9, wherein flowing the sample through the transient flow vial is via a needle.

11. The method of claim 1, wherein the transferring comprises:
    flowing the sample through an injection loop via pneumatic pressure.

12. The method of claim 1, wherein the transferring comprises:
    applying a pressure head to the sample via a pump and flowing the sample through a valve switch.

13. The method of claim 1, wherein the chemical reaction is a first chemical reaction, the product stream is a first product stream, the diluent is a first diluent, the sample is a first sample, and the measured chemical profile is a first measured chemical profile, the method further comprising:
    withdrawing from the reactor a portion of a second product stream of a second chemical reaction;
    mixing the portion of the second product stream with a second diluent to produce a second sample, the portion of the second product stream having a volume of less than about 200 μL;
    transferring the second sample to the liquid chromatography device;
    developing, via the liquid chromatography device, a measured chemical profile of the second sample, the second measured chemical profile including less than about a 1% carryover from the first measured chemical profile.

14. The method of claim 13, wherein the method proceeds without a priming run.

15. The method of claim 1, wherein the chemical reaction occurs in a homogenous mixture.

16. The method of claim 1, wherein the chemical reaction occurs in a heterogeneous mixture.

17. The method of claim 1, wherein real time measurement results are used to human or computer-aided decision making and reaction condition adjustment.

18. The method of claim 1, where real time measurement results are used for monitoring consistency of a process.

19. The method of claim 1, where real time measurement results are used for automated determination of input condition variable and output results relationship.

20. The method of claim 1, wherein the withdrawing includes drawing the portion of the product stream into a pocket of a sampling device via a first opening in the sampling device, the method further comprising:
 moving the portion of the product out of the pocket of the sampling device via a second opening in the sampling device, the second opening offset from the first opening.

21. A non-transitory computer-readable storage medium storing instructions, which when executed by a computer system, perform operations to:
 withdraw via a mechanical scoop from a reactor, a portion of the product stream of the chemical reaction;
 mix the portion of the product stream with a diluent to produce a sample, the portion of the product stream having a volume of less than about 200 µL and a total suspended solids content of at least about 25 mg/L;
 transfer the sample to a liquid chromatography device;
 develop, via the liquid chromatography device, a measured chemical profile of the sample for process monitoring or real time decision-making.

22. The non-transitory computer-readable storage medium of claim 21, the operations further comprising:
 adjust a reaction condition in the reactor based on differences between the measured chemical profile and a desired chemical profile.

23. The non-transitory computer-readable storage medium of claim 22, wherein the reaction condition includes at least one of a pump rate, a flow rate, a temperature, a pressure, and an application of light.

24. The non-transitory computer-readable storage medium of claim 21, wherein the diluent is added to the portion of the product stream at a ratio of at least about 50:1.

25. A system, comprising:
 a processor; and
 a memory in communication with the processor, wherein the memory includes an application program configured to perform operations to:
 withdraw via a mechanical scoop from a reactor, a portion of the product stream of the chemical reaction, the portion of the product stream having a slurry composition;
 mix the portion of the product stream with a diluent to produce a sample, the portion of the product stream having a volume of less than about 200 µL;
 transfer the sample to a liquid chromatography device;
 develop, via the liquid chromatography device, a measured chemical profile of the sample for process monitoring or real time decision-making.

26. The system of claim 25, the operations further comprising:
 adjust a reaction condition in the reactor based on differences between the measured chemical profile and a desired chemical profile.

27. The system of claim 26, wherein the reaction condition includes at least one of a pump rate, a flow rate, a temperature, a pressure, and an application of light.

28. The system of claim 25, wherein the diluent is added to the portion of the product stream at a ratio of at least about 50:1.

* * * * *